US012604133B2

(12) United States Patent
Goh et al.

(10) Patent No.: US 12,604,133 B2
(45) Date of Patent: Apr. 14, 2026

(54) SYSTEM AND METHOD OF ASSEMBLING AN ADJUSTABLE CLAMPING EAR CUP ASSEMBLY FOR AN AUDIO HEADSET

(71) Applicant: Dell Products LP, Round Rock, TX (US)

(72) Inventors: Peng Lip Goh, Singapore (SG); Deeder M. Aurongzeb, Austin, TX (US); Eng Kang Chng, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 167 days.

(21) Appl. No.: 18/611,079

(22) Filed: Mar. 20, 2024

(65) Prior Publication Data

US 2025/0301254 A1 Sep. 25, 2025

(51) Int. Cl.
*H04R 25/00* (2006.01)
*H04R 1/10* (2006.01)

(52) U.S. Cl.
CPC ......... *H04R 1/1066* (2013.01); *H04R 1/1008* (2013.01)

(58) Field of Classification Search
CPC ... H04R 1/1008; H04R 1/1066; H04R 1/1058
USPC .......................................................... 381/379
See application file for complete search history.

(56) References Cited

U.S. PATENT DOCUMENTS

| | | | | |
|---|---|---|---|---|
| 8,050,444 B2 | 11/2011 | Smith | | |
| 8,194,909 B2 * | 6/2012 | Kuhtz | H04R 1/1008 381/381 | |
| 9,445,185 B2 | 9/2016 | Brunner | | |
| 11,272,280 B1 * | 3/2022 | Minerbi | H04R 1/1008 | |
| 2015/0139473 A1 | 5/2015 | Jaynes | | |

FOREIGN PATENT DOCUMENTS

| | | |
|---|---|---|
| EP | 1908985 A1 | 4/2008 |
| EP | 2861887 B1 | 7/2013 |
| EP | 4227543 A1 | 2/2022 |

* cited by examiner

*Primary Examiner* — Md S Elahee
(74) *Attorney, Agent, or Firm* — Prol Intellectual Property Law, PLLC; H. Kenneth Prol

(57) ABSTRACT

An adjustable clamping earcup assembly may comprise an outer ear cup cover attached to a cushion to enclose a base plate that is operably coupled to a porous piston and piston rod disposed within a magnetorheological (MR) fluid barrel containing MR fluid, an outermost magnet pair and an innermost magnet pair in the outer ear cup cover, where each magnet pair generates magnet flux to cause MR fluid disposed between the magnets hold the porous piston with respect to the MR fluid barrel and the piston rod at a level of extension, the MR fluid barrel operatively coupled to a clamping headband and moveable under an external force between a low-clamp force position between the innermost magnet pair and a high-clamp position between the outermost magnet pair.

20 Claims, 9 Drawing Sheets

CROSS-SECTIONAL VIEW

SYSTEM AND METHOD OF ASSEMBLING AN ADJUSTABLE CLAMPING EAR CUP ASSEMBLY FOR AN AUDIO HEADSET

FIELD OF THE DISCLOSURE

The present disclosure generally relates to assembly of an audio headset for an information handling system. More specifically, the present disclosure relates to the assembly of an audio headset that locks into a plurality of clamping positions, each providing a differing degree of clamping force on the wearer's head.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for peripheral input/output devices or wireless connectivity to wireless peripheral input/output devices that may also include a wired or wireless audio headset, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
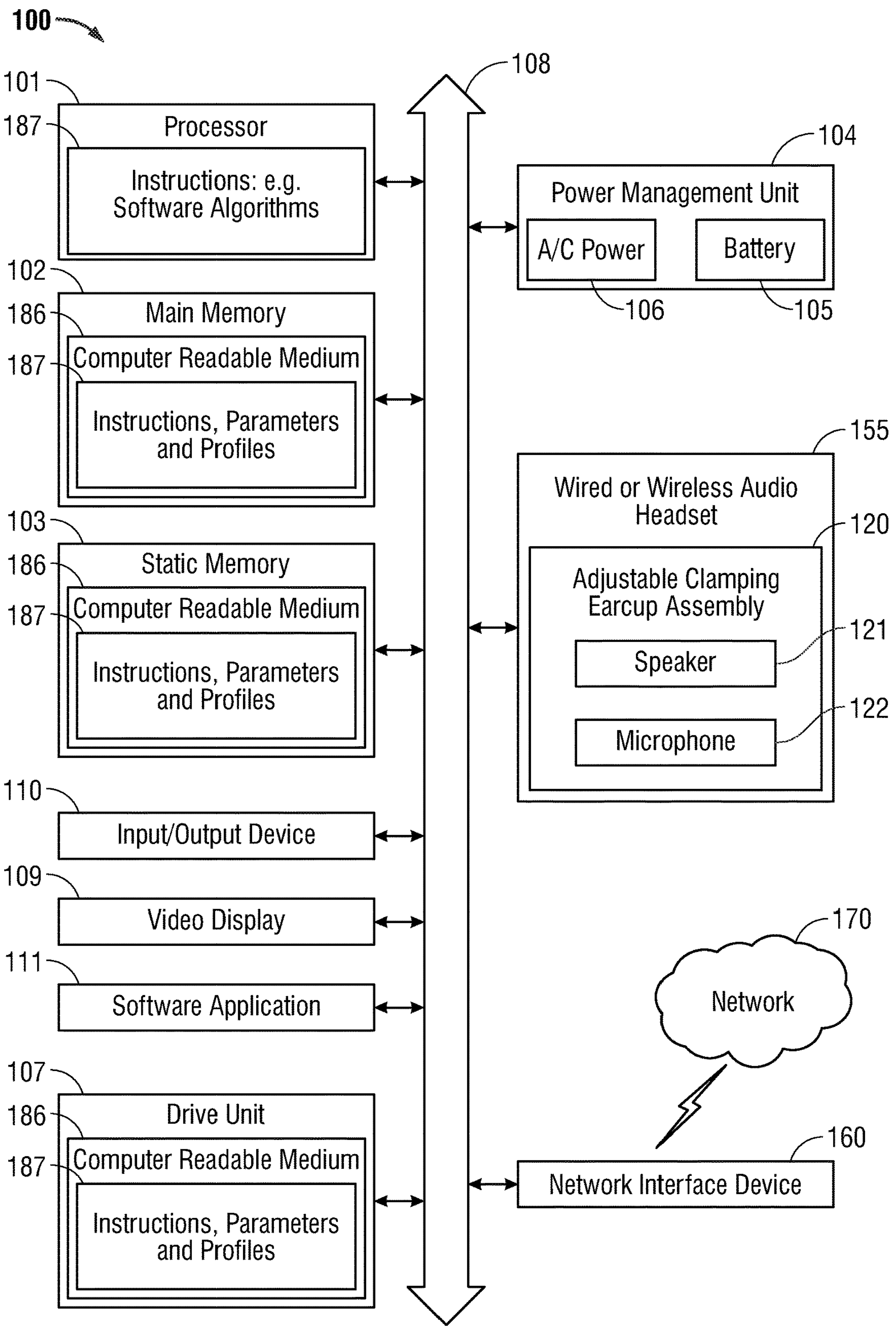
FIG. 1 is a block diagram illustrating an information handling system operatively coupled to an adjustable clamping earcup assembly according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Audio headsets such as headphones with cushioned ear cups that surround the ear provide some clamping force pulling the two ear cups together to remain firmly on the wearer's head, and in some cases to decrease audible external noise. Existing audio headsets provide little to no adjustability in this clamping force, or have a burdensome clamping adjustment mechanism. As a result, intrusive external noise in an under-clamped situation, or pain or irritation to the user's ears or head after a long period of use in an over-clamped situation may occur. A system is needed to allow the user to intuitively and easily adjust this clamping force to their preference.

The adjustable clamping earcup assembly in embodiments of the present disclosure address these issues by employing a piston with a magnetorheological (MR) fluid barrel that may apply clamping pressure of varying degrees on the ear cup cushion and the wearer's head under external force applied by the wearer to their preference. The MR fluid barrel containing MR fluid may move with respect to the piston and with respect to a plurality of magnets within the earcup under external pressure by the wearer to apply varying degrees of pressure on the piston caused by viscosity of the MR fluid, and, accordingly, adjust clamping pressure on the ear cups, due to the headband of the audio headset.

The ear cup assembly may comprise an ear cup cover attached to the ear cup cushion, with the ear cup cover enclosing an end of the audio headset headband, an ear cup base plate, a sound chamber, a piston assembly, the MR fluid barrel operatively coupled to the end of the headband, and a plurality of magnet pairs for affecting the viscosity and movement of the MR fluid and a porous piston in the MR fluid barrel. The ear cup base plate in embodiments herein may be operatively coupled on an inner surface of the ear cup cushion for positioning against the wearer's head, and operatively coupled on an outer surface to the sound chamber enclosing the speaker. The piston assembly including an inner flange, a piston rod, and a porous piston may be operatively coupled to the outer surface of the sound chamber, with the inner flange fixed to the sound chamber surface. The porous piston may be moveably disposed within the MR fluid barrel containing the MR fluid, and may be fixed in position with respect to the plurality of magnet pairs disposed within the ear cup and around the outside of the MR fluid barrel. This may allow the MR fluid barrel to move with respect to both the porous piston inside and the plurality of magnet pairs outside of the MR fluid barrel. The MR fluid barrel is operatively coupled to a clamping headband via an ear cup rotational tilt clamp.

The plurality of magnets may be arranged in an MR barrel receiver cavity of an outer cup cover such that an outer pair is situated around a cavity for receiving the MR fluid barrel further away from the ear cup cushion than an inner pair situated around the cavity for receiving the MR fluid barrel. Each pair of magnets in embodiments may have opposing polarities to cause magnetic flux to move between the two magnets in each pair, however any polarity may work between pairs of magnets. As the MR fluid barrel is moved between any given pair of magnets in the cavity for receiving the MR fluid barrel, the magnetic flux between those two magnets in that pair may cause the MR fluid to become highly viscous due to alignment of magnetic particles between the magnet pair to create a "wall" that and impedes movement of the porous piston with respect to the MR fluid in the MR fluid barrel. In other words, as the magnets in the given magnet pair (e.g., inner magnet pair situated closer to user's head or outer magnet pair situated further from user's head and closer to outer ear cup cover) are moved to surround any portion of the MR fluid barrel due to external force on the ear cup cover by the wearer, the magnetic flux acts on the MR fluid in the MR fluid barrel on one or both sides of the porous piston to hold the barrel in place with respect to the porous piston.

When the MR fluid barrel is positioned between the innermost magnet pair, the majority of the MR fluid is disposed and a wall is formed that is aligned between the inner magnet pair between the inner surface of the porous piston and the inner flange of the piston assembly. This causes the MR fluid barrel to be in an inward position causing minimal inward pressure from the position of the headband post which is allowed to relax outwardly due to the viscous forces of the MR fluid on the inner surface of the porous piston holding it in a retracted position within the MR fluid barrel. This may result in minimal clamping force operatively coupled to the MR fluid barrel in the low clamp position. When the MR fluid barrel is positioned between the outermost magnet pair, the majority of the MR fluid is disposed against the outer surface of the porous piston, away from the inner flange. This causes the MR fluid barrel to be in an outward position causing maximum inward pressure from the position of the headband post which applies more clamping pressure due to viscous forces of the MR fluid on the outer surface of the porous piston holding it in an extended position in the MR fluid barrel. That viscous force may transfer clamping force of the headband post that is operatively coupled to the MR fluid barrel to the sound chamber, ear cup plate, and ear cup cushion via the extended porous piston to cause a maximum clamping force. This increased clamping force may then be released by the user pulling the ear cup away from the ears, causing the MR fluid barrel to move toward and align partially or wholly under the innermost magnet pair in an intermediate or minimum clamping force position depending on how much the ear cup is pulled.

As described above, the magnetic flux between any given pair of magnets may cause the MR fluid disposed between those magnets in the MR fluid barrel to become highly viscous and create a wall that impedes movement of the MR fluid barrel with respect to the porous piston and magnets in any position with respect to the magnet pairs. This may effectively hold the ear cups in any given clamping position at or between a maximum or high clamping force position and a minimum or low clamping force position until an external force is exerted on the ear cup cover by the wearer to overcome the force of the viscous MR fluid wall on either or both sides of the porous piston and move the MR fluid barrel from left or right between the inner and outer pairs of magnets in the MR fluid barrel receiver cavity of the outer earcup cover. As the user exerts such an external force either pushing the ear cup cover away from or toward the user's ear, the MR fluid barrel may move such that it is between a first magnet pair (e.g., innermost pair) and a second magnet pair (e.g., outermost pair) or partially between both magnet pairs in any position. In such a position, the MR fluid within the MR fluid barrel may undergo minimal magnetic flux due to its position between magnet pairs. This may cause the MR fluid to become less viscous between the magnet pairs causing alignment of the MR fluid particles to form a wall on either side of the porous piston. The MR fluid particles may pass between the sides of the porous piston as the MR fluid barrel is moved relative to the porous piston and the magnet pairs. In other words, moving the magnet pairs relative to the MR fluid barrel may allow the porous piston to move with respect to the MR fluid barrel. This movement may cause the MR fluid barrel to establish a position between either or both magnet pairs, and the magnetic flux between the magnets in either or both magnet pairs increases viscosity of the MR fluid, forming one or more walls of MR fluid particles, locking the piston in place with respect to the MR fluid barrel.

The position of the piston with respect to the MR fluid barrel in any of a plurality of these locked positions may vary. For example, as described above, when the MR fluid barrel is disposed between the innermost magnet pair, the piston may be locked with the majority of the MR fluid disposed between the piston and the inner flange of the piston assembly, causing minimal inner force on the piston from the viscosity wall of the MR fluid and a minimal clamping force from the headband post operatively coupled to the MR fluid barrel. In contrast, when the MR fluid barrel is disposed between the outermost magnet pair, the piston may be locked with the majority of the MR fluid disposed on the outer surface of the piston, causing maximum inner force on the piston from the viscosity wall of the MR fluid and maximum clamping force from the headband post operatively coupled to the MR fluid barrel. In another embodiment herein, a third intermediate magnet pair may be disposed between the innermost magnet pair and the outermost magnet pair to lock the piston with half of the MR fluid disposed on either side of the piston surface to provide an intermediate position of the piston for a greater range of intermediate headband clamping force positions available from movement of the magnet pairs with respect to the MR fluid barrel. Thus, a plurality of clamping forces may be applied to the ear cushions and may be adjustable by the wearer by applying an external pushing or pulling force on the ear cup cover. Because the viscosity wall of the MR fluid between one or both magnet pairs locks the piston into place with respect to the MR fluid barrel when the MR fluid barrel is disposed between any of these given magnetic pairs (e.g., innermost, outermost, or optional additional magnet pairs), the adjustable clamping force of the headband may be maintained until the user adjusts the clamping force again via exertion of a pushing or pulling force.

FIG. 1 illustrates an information handling system 100 according to several aspects of the present disclosure. In various embodiments described herein, an adjustable clamping earcup assembly 120 of a wired or wireless audio headset 115 may be operatively coupled to the information handling system 100 such that a speaker 121 emits audible sound generated by the software application 111 or received via streaming or communication with the information handling system 100. The audio headset 115 may also include a microphone 122 to receive audio input from a user. As described herein, the adjustable clamping earcup assembly 120 of a wired or wireless headset 115 in an embodiment may employ a piston that may adjust a clamping pressure of a headband of the audio headset 115 to varying degrees on the ear cup cushion and the wearer's head when external force is applied by the wearer to an ear cup cover to their preference. A magnetorheological (MR) fluid barrel containing MR fluid may move with respect to the piston and with respect to a plurality of magnets within the earcup cover under the external force applied by the wearer to the ear cup cover to move the magnets and thereby adjust, to varying degrees, the location of the piston that is fixed into position by viscosity of the MR fluid between pairs of magnets in the ear cup cover aligning magnetic particles within the MR fluid, as described in greater detail below. In some embodiments, the adjustable clamping earcup assembly 120 may be part of a wired audio headset 115 that is operatively coupled to the information handling system 100 via a wired connection, such as a universal serial bus (USB) connection. In other embodiments, the adjustable clamping earcup assembly 120 may be part of a wireless audio headset 115 that is operatively coupled to the information handling system 100 via a wireless link established through the network interface device 160.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, various input and output (I/O) devices 110, an adjustable clamping earcup assembly, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a video display 109, adjustable clamping earcup assembly 120 of a wired or wireless audio headset 115, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101. The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101.

The network interface device 160 may provide connectivity of the information handling system 100 to wireless peripheral devices such as the adjustable clamping earcup assembly 120 or to the network 170 via a network access point (AP) in an embodiment. The network 170 in some embodiments may be a wired local area network (LAN), a wireless personal area network (WPAN) including a Bluetooth® or Bluetooth® Low Energy (BLE) WPAN, a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100. Application instructions 187 may include software that includes communication software or other software or firmware applications such as gaming or streaming software that includes audio interfaces aspects for use with audio headset 115.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2A:
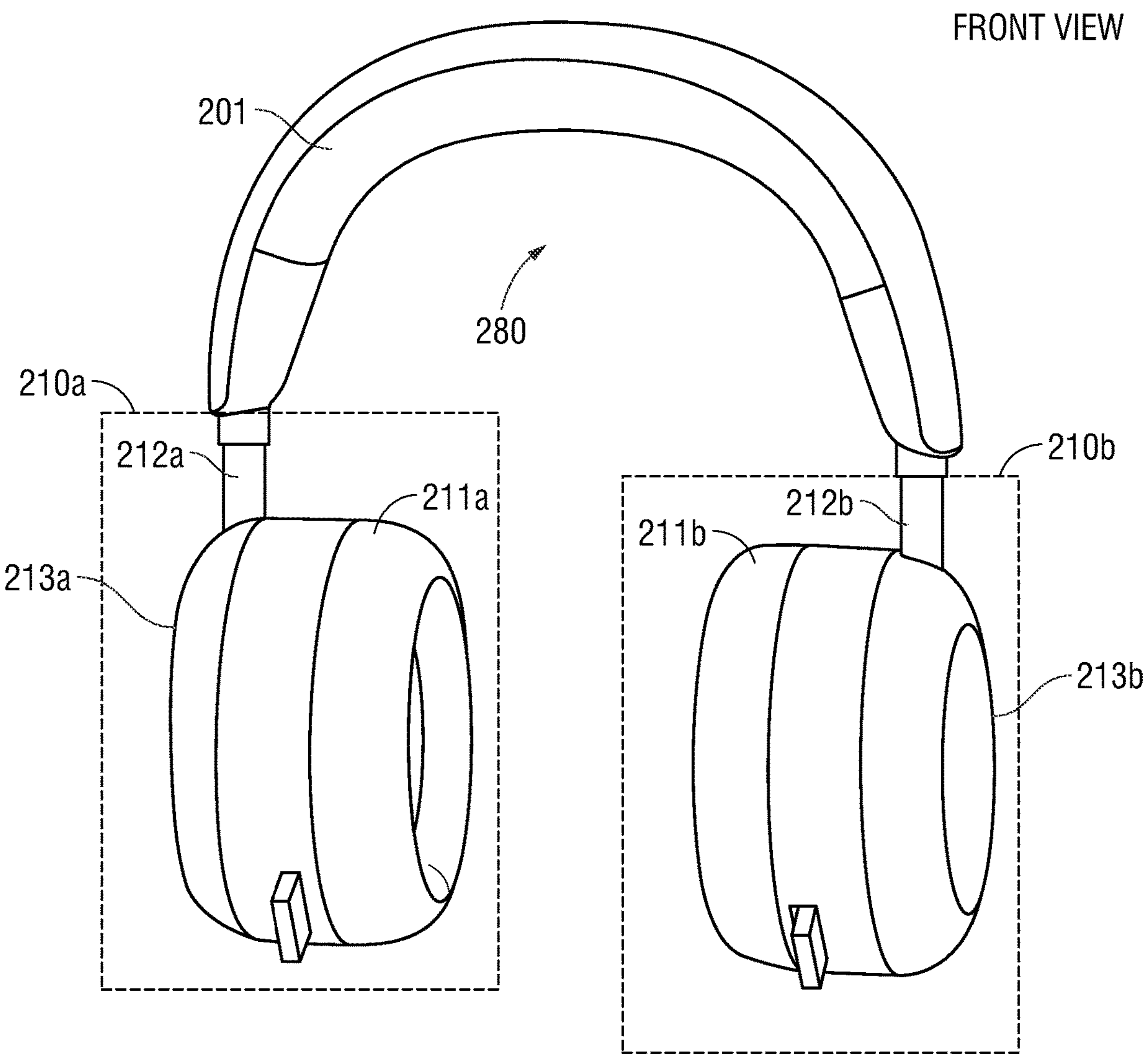
FIG. 2A is a graphical diagram illustrating a front view of an audio headset incorporating an adjustable clamping earcup assembly according to an embodiment of the present disclosure.

FIG. 2A is a graphical diagram illustrating a front view of an audio headset incorporating adjustable clamping earcup assemblies housed within each of two earcup covers operatively coupled via a headband according to an embodiment of the present disclosure. An adjustable clamping earcup assembly 210*a* in an embodiment may comprise a right ear cup to be worn over a wearer's right ear. A second adjustable clamping ear cup assembly 210*b* may also comprise a left ear cup to be worn over a wearer's left ear. Each adjustable clamping ear cup assembly 210*a* and 210*b* may be formed to include an ear cup cushion 211*a* or 211*b* to be disposed around the wearer's ear, operatively coupled to a speaker platform, an outer earcup cover 213*a* or 213*b*, and a portion of a headband connector 212 to clamping headband 201. As described herein, an audio headset 280 in an embodiment may include the pair of adjustable clamping ear cup assemblies 210*a* and 210*b* with outer earcup covers 213*a* and 213*b* on cushioned ear cups 211*a* and 211*b* that surround the wearer's ear and provide some clamping force via headband 201 pulling the two ear cups together to remain firmly on the wearer's head, and in some cases to decrease audible external noise. Existing audio headsets provide little to no adjustability in this clamping force, or have complicated and cumbersome clamping adjustment mechanisms causing potential intrusive external noise in an under-clamped situation, or causing pain or irritation to the user's ears or head after a long period of use due to poor fit. The adjustable clamping earcup assemblies 210*a* and 210*b* in an embodiment may each employ an internal piston to apply clamping pressure of varying degrees on the adjustable clamping earcup assemblies from the headband 201, including the headband connectors 212*a* and 212*b* to adjust clamping force applied according to the wearer's preference.

The left adjustable clamping earcup assembly including 210*a* may be operably coupled to headband 201 via the headband connector 212*a*, and the headband 201 may also be operatively coupled to the right adjustable clamping earcup assembly 210*b* via headband connector 212*b* in an embodiment. An outer earcup cover 213*a* or 213*b* is situated farthest from the earcup cushion 211*a* or 211*b*, respectively. An inner portion of each adjustable clamping earcup assembly 210*a* or 210*b* may house a speaker and operatively couple to a piston and MR fluid barrel situated within the outer earcup cover 213*a* or 213*b*, respectively. A wearer in an embodiment may place the headband 201 over the wearer's head with a left ear cup assembly 210*a* on a left ear and the right ear cup assembly 210*b* on the right ear.

Figure 2B:
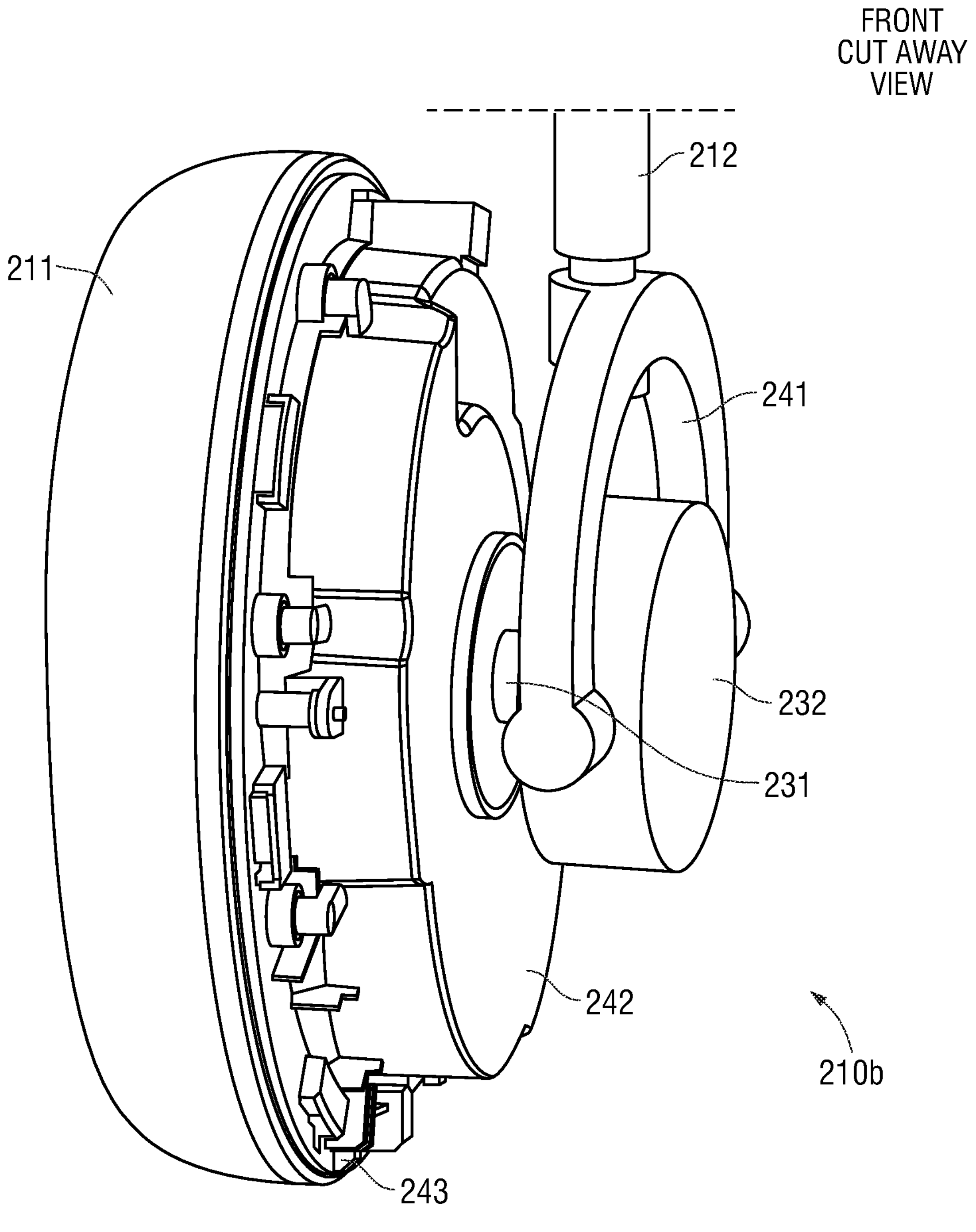
FIG. 2B is a graphical diagram illustrating a front cutaway view of an adjustable clamping earcup assembly according to an embodiment of the present disclosure.

FIG. 2B is a graphical diagram illustrating a front cutaway perspective view of various internal components of an adjustable clamping earcup assembly according to an embodiment of the present disclosure. An ear cup cushion 211 may be operatively coupled to an inner side of an ear cup base plate 243 and a sound chamber cover 242 housing a speaker (not shown) may be operatively coupled to an outer side of the ear cup base plate 243 in an embodiment. A piston assembly 231 may be partially disposed within a magnetorheological (MR) fluid barrel 232, such that a porous piston of the piston assembly 231 disposed within the MR fluid barrel 232 is moveable from an inner portion (e.g., nearest the cushion 211) to an outer portion (e.g., farthest from the cushion 211) of the MR fluid barrel 232. The piston assembly 231 may be operatively coupled to an outer surface of the sound chamber cover 242 or the base plate 243 in some embodiments. An ear cup rotational tilt clamp 241 in an embodiment may be operatively coupled to an outside casing of the MR fluid barrel 232 such that the ear cup rotational tilt clamp 241 can rotate with respect to the MR fluid barrel 232 but applies clamping force from headband connector 212 to the MR fluid barrel 232. The headband connector 212 may be operatively coupled in an embodiment to the ear cup rotational tilt clamp 241 such that its clamping force is adjustable depending on the extension or retraction of the piston assembly 231 inside the MR fluid barrel 232 when the MR fluid barrel is moved between two or more sets of magnetic pairs in an outer earcup cover.

Figure 2C:
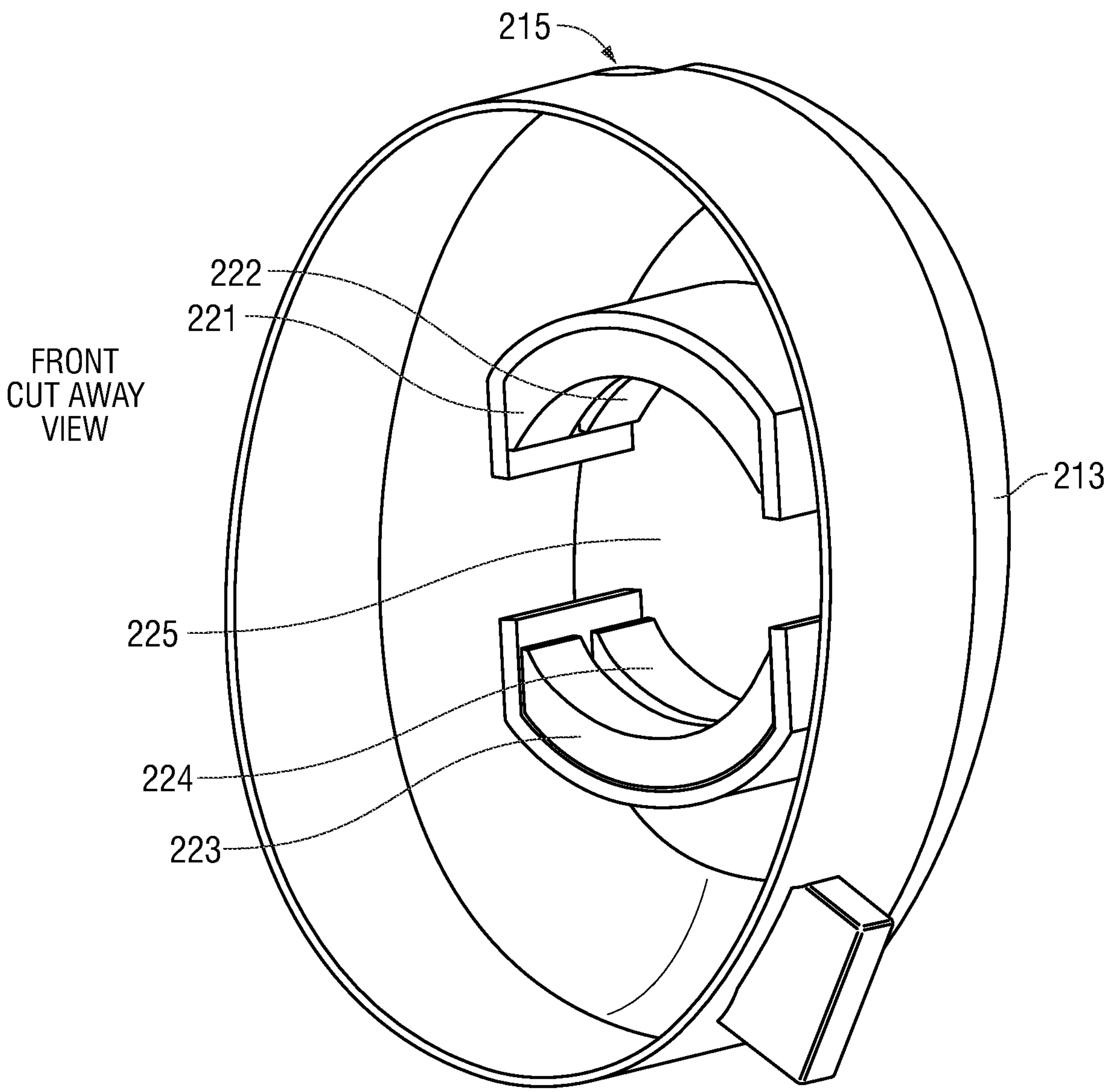
FIG. 2C is a graphical diagram illustrating a front cutaway view of an ear cup cover housing a plurality of magnet pairs according to an embodiment of the present disclosure.

FIG. 2C is a graphical diagram illustrating a front cutaway view of an outer ear cup cover housing a plurality of magnet pairs in a magnetorheological (MR) fluid barrel receiver cavity 225 for exerting a magnetic flux across MR fluid within an MR fluid barrel according to an embodiment of the present disclosure. A plurality of magnet pairs may be fixed in an embodiment within an outer ear cup cover housing 213 such that an outer pair including 222 and 224 is situated further away from the ear cup cushion than an inner pair including 221 and 223. In some embodiments, and the magnets in each pair have opposing polarities to cause magnetic flux between the magnets in each pair. More specifically, magnet 222 may have a polarity that is opposite the polarity of magnet 224 to cause magnetic flux between magnets 222 and 224 within the outermost magnet pair. As another example, magnet 223 may have a polarity that is opposite the polarity of magnet 221 to cause magnetic flux between magnets 221 and 223 within the innermost magnet pair. These opposing magnetic polarities of magnets 221 and 222 and magnets 223 and 224 create a magnetic field to form a wall in MR fluid when the MR fluid barrel is aligned between those magnet pairs. Further, magnets 221 and 222 may have the same polarity to impede magnetic flux between magnets 221 and 222, and magnets 223 and 224 may have the same polarity to impeded magnetic flux between magnets 223 and 224. In other embodiments, magnet pair 221 and 222 and magnet 223 and 224 may have similar polarities to cause a rejection magnetic that may work with some magnetic particles to cause wall formation within MR fluid. A headband connector (e.g., 212*a* or 212*b* of FIG. 2A) in an embodiment may be inserted through an opening 215 within the outer ear cup cover housing 213.

Magnetic flux or other magnetic field influence between the innermost magnet pair including 221 and 223 in an embodiment may make magnetic particles align in the MR fluid disposed between magnets 221 and 223 to make it highly viscous in the magnetic field between innermost magnet pair 221 and 223 when the MR fluid barrel is moved between these magnets 221 and 223. This holds a porous piston in place with respect to the innermost magnet pair 221 and 223, as described in greater detail below with respect to FIG. 4A. In an embodiment, the wearer's external force or pressing on the outer ear cup cover housing 213, which may be slidably attached to the adjustable clamping earcup assembly (210 of FIG. 2B) may move the magnet pairs (e.g., 221 and 223, or 222 and 224) with respect to an MR fluid barrel disposed between them such that MR fluid barrel is disposed at least partially between either or both of the two magnet pairs. This establishes one or more magnetic fields acting on the MR fluid within the MR fluid barrel. In other words, the MR fluid barrel containing the MR fluid may be disposed at least partially between the pair of magnets 221 and 223 and the pair of magnets 222 and 224 with a wall established on either side of the porous piston inside MR fluid barrel 252. The MR fluid barrel in an embodiment may be moved between a high-clamp position between the outer magnet pair 222 and 224 or a low-clamp position fully between inner magnet pair 221 and 223. The magnetic flux between the outer magnet pair 222 and 224 may cause MR fluid within the MR fluid barrel to become highly viscous in that magnetic field creating a wall of aligned magnetic particles, holding the porous piston in place with respect to the MR fluid barrel, as described in greater detail below with respect to FIG. 4B. The MR fluid barrel in an embodiment may be moved to an intermediate clamp position between an intermediate magnet pair (not shown) between magnet pair 222 and 224 and magnet pair 221 and 223. The magnetic flux between such an intermediate magnet pair may cause MR fluid within the MR fluid barrel to become highly viscous in that magnetic field creating a wall of aligned magnetic particles, holding the porous piston in place with respect to the MR fluid barrel and applying a headband clamping force based on the held position of the MR fluid barrel and the amount of extension or retraction of the porous piston shaft therefrom to the earcup base plate and earcup cushion.

Figure 3:
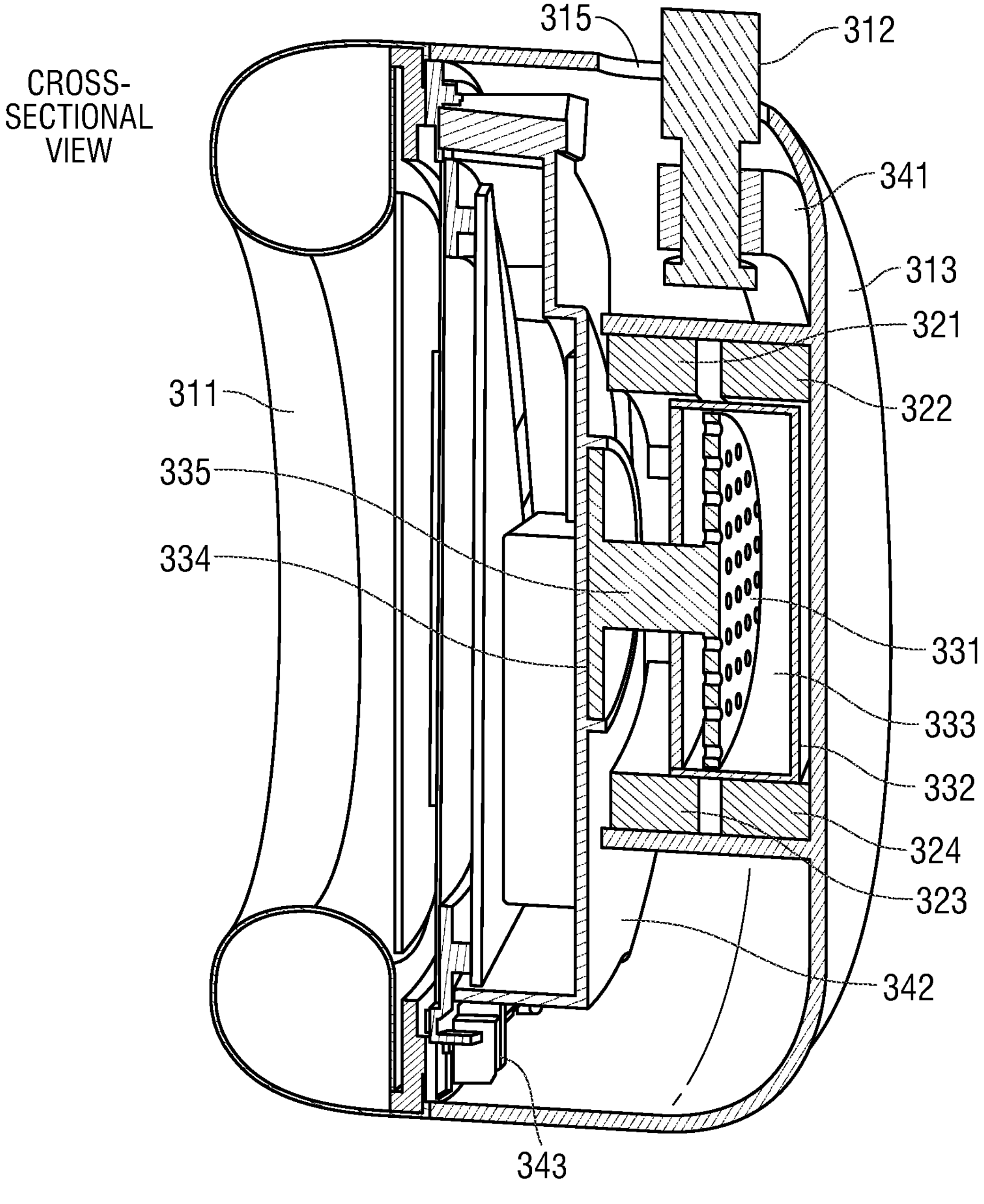
FIG. 3 is a graphical diagram illustrating a perspective cross-sectional view of an adjustable clamping earcup assembly including a magnetorheological (MR) fluid barrel moveable with respect to a porous piston according to an embodiment of the present disclosure.

FIG. 3 is a graphical diagram illustrating a cross-sectional view of an adjustable clamping earcup assembly including a magnetorheological (MR) fluid barrel moveable with respect to a porous piston and sets of magnets in an outer ear cup cover to provide varying degrees of clamping force according to an embodiment of the present disclosure. An ear cup cushion 311 may be operatively coupled to an inner side of an ear cup base plate 343 and a sound chamber cover 342 that may be operatively coupled to an outer side of the ear cup base plate 343 in an embodiment. A porous piston 331 attached to an inner flange 334 via a piston rod 335 of a piston assembly that includes 331, 334, and 335 may be disposed within a magnetorheological (MR) fluid barrel 332 containing MR fluid in a cavity 333 within, such that the porous piston 331 is moveable from an inner portion to an outer portion of the MR fluid barrel 332. The piston assembly inner flange 334 may be operatively coupled to an outer surface of the sound chamber cover 342 in an embodiment. An ear cup rotational tilt clamp 341 in an embodiment may be operatively coupled to the sides of the MR fluid barrel 332 as well as headband connector 312 to provide clamping force from a headband (not shown). The ear cup rotational tilt clamp 341 can rotate with respect to the MR fluid barrel 332 but fixes to a horizontal position of the MR fluid barrel 332 to slidingly adjust clamping force from the headband and the headband connector 312.

A plurality of magnet pairs 321/323 and 322/324 may be fixed in an embodiment within an MR fluid barrel receiving cavity (e.g., 225 of FIG. 2C) in an ear cup cover 313 such that an outer magnet pair 322/324 is situated further away from the ear cup cushion 311 than an inner magnet pair 321/323. In an embodiment, the magnets in each pair 321/323 and 322/324 have opposing polarities to cause magnetic flux between the magnets in each pair. In other embodiments, magnet pairs 321/323 and 322/324 may use any combination of polarities to establish a magnetic field between the magnets for influence on MR fluid in sliding MR fluid barrel 332. A headband connector 312 in an embodiment may be inserted through an opening 315 within the ear cup cover 313. The headband connector 312 may be operatively coupled in an embodiment to the ear cup rotational tilt clamp 341 and the MR fluid barrel 332.

The MR fluid barrel 332 and porous piston 331 in an embodiment may be disposed between the magnets 321 and 323 or 322 and 324 in the outer ear cup cover 313 such that the MR fluid barrel 332 is moveable from a low-clamp position to a high-clamp position. In an embodiment, a low-clamping force position is when the MR fluid barrel is in an inward position between the innermost magnet pair 321/323 in which the MR fluid 333 forms a magnetic wall of fluid inside the inner wall of porous piston 331. In this way, the porous piston 331 and piston rod 335 are retracted into MR fluid barrel 332 such that the headband shaft 312 may be allowed outward movement to relax the clamping force to exert a minimal force on the porous piston 335 on the base plate 343 and sound chamber cover 342. In an embodiment, a high-clamp position is an outward position of MR fluid barrel 332 between the outermost magnet pair 322/324 in which the MR fluid forms a magnetic wall of fluid on an outside surface of the porous piston 331 causing the piston rod 335 to be extended from MR fluid barrel and the headband exerts a maximum force via the headband connector 312 and the porous piston 331 in the MR fluid barrel 332. In one specific example, the MR fluid barrel 332 and porous piston 331 in an embodiment may be disposed between the outer magnet pair 322 and 324, such that the majority of the MR fluid 333 aligns between the magnet pair 332 and 324 and is disposed outside the outer surface of the porous piston 331. High viscosity of the MR fluid 333, due to alignment of magnet particles in the MR fluid 333 between outer magnet pair 322 and 324, in such a scenario may impede outward movement of the porous piston 331 with respect to the MR fluid barrel 332 holding the piston rod 335 in an extended position. This causes increased inward headband clamping force from the headband connector shaft 312 on the MR fluid barrel 332, porous piston 331, and extended piston rod 335 toward the cushion 311. The outer ear cup cover 313 in an embodiment may be operatively coupled to the ear cup base plate 343 plate to form a first ear cup assembly.

The MR fluid barrel 332 in an embodiment may thus be placed in a high-clamp position between the outer magnet pair 322 and 324, and the magnetic flux between the outer magnet pair 322 and 324 causes the MR fluid 333 to become highly viscous. This high viscosity force may hold the porous piston 331 in place with respect to the MR fluid barrel 332. The highly viscous MR fluid 333 in an embodiment may impede outward motion of porous piston 331, causing the piston assembly inner flange 334 with the extended piston 335 to exert inward force from the headband on the ear cup base plate 343 toward the user's ear, and hold the ear cup cushion 311 in a closer, high-clamp state shown in FIG. 3. Pulling the outer earcup cover 313 by the user moves the magnet pairs 321/323 relative to the MR fluid barrel 332 causing the fluid to align inside the porous piston 331 and retraction of the piston rod 335 to a lower clamping position as the clamping force from piston connector shaft 312 is relaxed in embodiments herein.

Figure 4A:
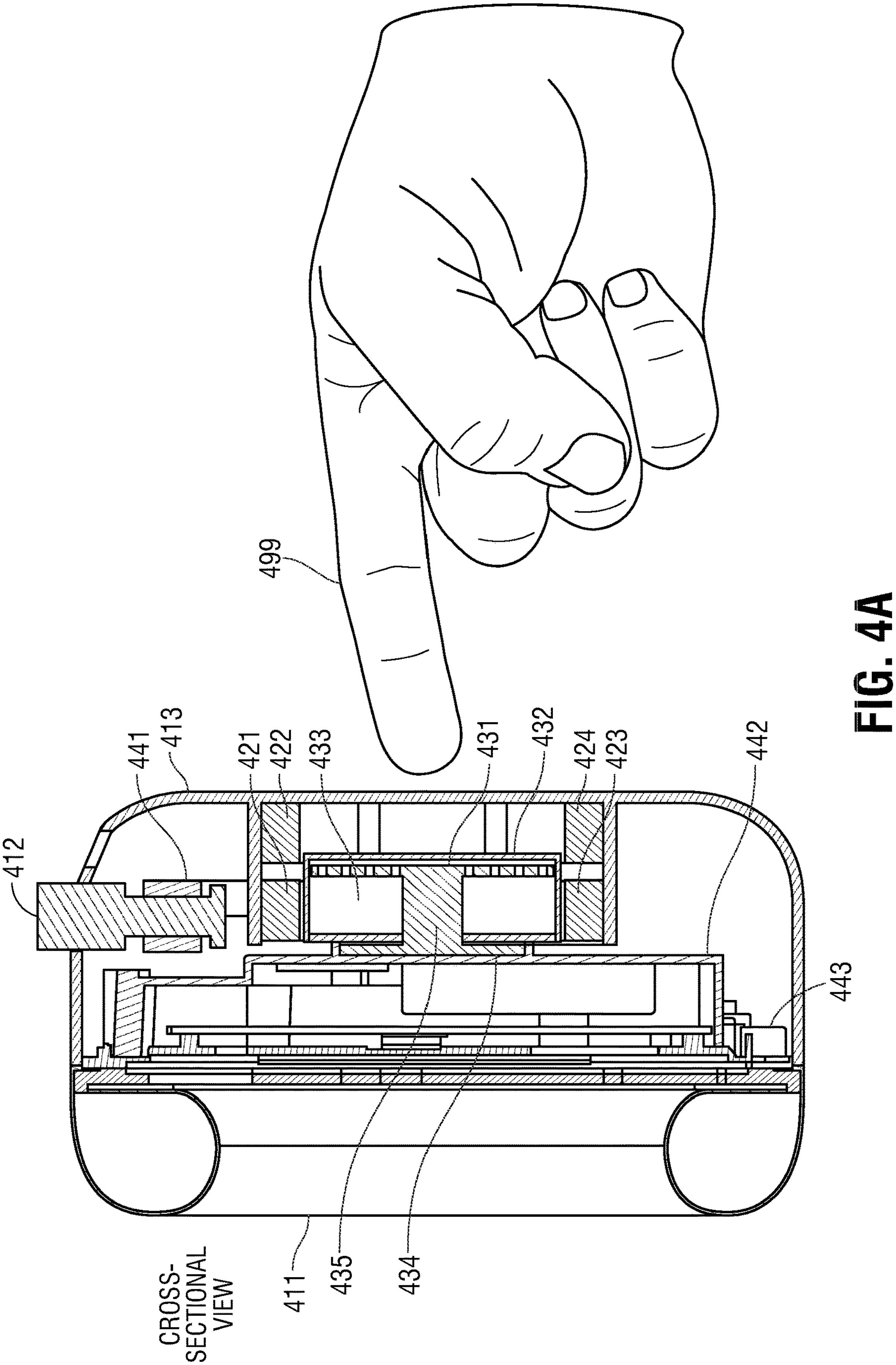
FIG. 4A is a graphical diagram illustrating a cross-sectional view of an adjustable clamping earcup assembly in a low clamp position undergoing external pressure by a wearer to adjust clamping position according to an embodiment of the present disclosure.

FIG. 4A is a graphical diagram illustrating a cross-sectional view of an adjustable clamping earcup assembly undergoing external pressure, such as pressing by a wearer to adjust a clamping force on the wearer's head from a low-clamp position to any higher-clamping position according to an embodiment of the present disclosure. As described herein, the plurality of magnet pairs (e.g., 421/423 and 422/424) in an embodiment may be stacked such that an outermost pair 422/424 is situated further away from the ear cup cushion 411 than an inner pair 421/423. Each pair of magnets (e.g., 421/423 and 422/424) in an embodiment may have opposing polarities to cause magnetic flux to set up between the two magnets in each pair. As the MR fluid barrel 432 is moved between any given pair of magnets (e.g., 421/423 or 422/424), the magnetic flux between those two magnets in that pair may cause the MR fluid 433 to align magnetic particles in the MR fluid 433 and become highly viscous on either side of the porous piston 431 to impede movement of the porous piston 431 with respect to the MR fluid 433. In other words, as the magnets in the given magnet pair (e.g., 421/423 and 422/424) are moved to surround portions of the MR fluid barrel 432 due to external force 499 pressing on the ear cup cover 413 by the wearer, the magnetic flux acts on the MR fluid barrel 432 to hold the barrel 432 in place with respect to the porous piston 431 when external force 499 stops. When the MR fluid barrel 432 is fully positioned between the innermost magnet pair 421/423, the majority of the MR fluid 433 magnetic particles are aligned in a high viscosity wall disposed between the porous piston 431 and the inner flange 434 of the piston assembly and the piston rod is retraced into the MR fluid barrel 432. This causes the headband clamping force from headband connector shaft 412 to relax and exert a minimal inward pressure via the ear cup rotation tilt clamp 441 on MR fluid barrel 432 due to viscous forces of the MR fluid 433 on the porous piston 431 in the low-clamp position shown in FIG. 4A. This may result in minimal clamping force.

An ear cup cushion 411 may be operatively coupled to an inner side of an ear cup base plate 443 and a sound chamber cover 442 may be operatively coupled to an outer side of the ear cup base plate 443 in an embodiment. A porous piston 431 in an embodiment, attached to an inner flange 434 via a piston rod 435 of a piston assembly, may be disposed within an MR fluid barrel 432, such that the porous piston 431 is moveable from an inner portion to an outer portion of the MR fluid barrel 432. The piston assembly inner flange 434 may be operatively coupled to an outer surface of the sound chamber cover 442 in an embodiment. The MR fluid barrel 432 may be in an inward position and it and porous piston 431 in an embodiment may be disposed between the inner magnet pair 421 and 424 in a low-clamp position in which the MR fluid 433 exerts a minimal force on the porous piston 431 and retracts piston rod 435 as shown in an embodiment of FIG. 4A. This is due to the fact that the majority of the MR fluid 433 magnetic particles are aligned in a high-viscosity wall disposed inside the inner surface of the porous piston 431, or between the porous piston 431 and the flange 434 allowing the headband clamping force to relax when piston rod 435 is retracted. Thus, very little of the MR fluid 433 may be situated outside of the porous piston 431 and piston rod 435 is retracted in MR fluid barrel 432 and reduces clamping force from the operatively-coupled headband connector shaft 412, and thus, the headband is allowed to open some. Headband connector shaft 412 is operatively coupled with and able to move horizontally with the MR fluid barrel 432 via the ear cup rotational tilt clamp 441 in embodiments herein.

Figure 4B:
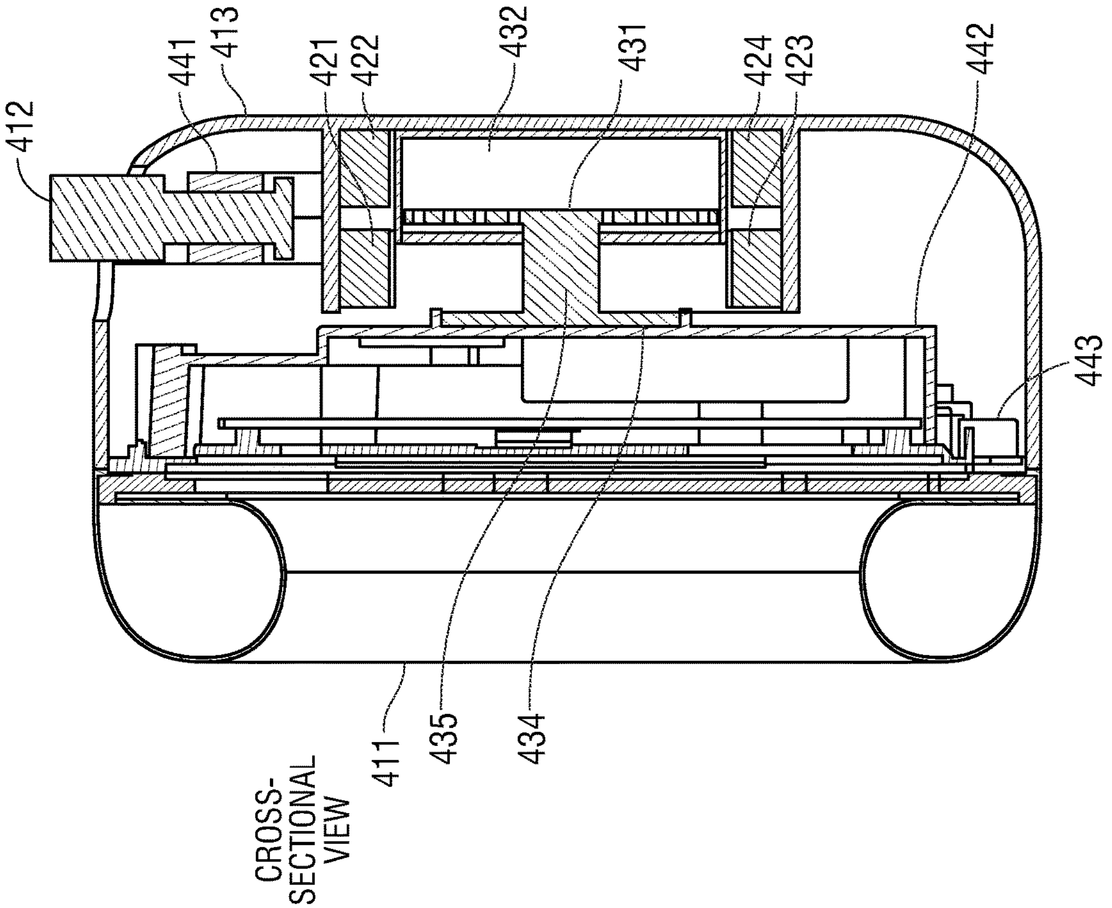
FIG. 4B is a graphical diagram illustrating a cross-sectional view of an adjustable clamping earcup assembly placed in a high-clamp position according to an embodiment of the present disclosure.

Magnetic flux between the innermost magnet pair 421 and 423 in an embodiment may make the MR fluid 433 highly viscous between the magnets 421 and 423, holding the porous piston 431 in place in the MR fluid barrel 432 with the piston rod 435 retracted in the MR fluid barrel 432. This, in turn, may hold the MR fluid barrel 432 and the MR fluid 433 in place with respect to the porous piston 431 and the retracted piston rod 435. The headband connector shaft 412 coupled to the MR fluid barrel via the ear cup rotation tilt clamp 441 is allowed to relax to an outermost position to reduce the headband clamping force, providing a constant level of minimal pressure on the porous piston 431 from the inside surface by the viscosity of the MR fluid 433 and yield a low-clamp force from the headband. As described herein, the magnetic flux between any given pair of magnets (e.g., 421/423 or 422/424) housed within the ear cup cover 413 may cause the MR fluid 433 disposed between those magnets to become highly viscous via alignment of magnetic particles in those magnetic fields and impede movement of the MR fluid barrel 432 with respect to the piston and magnets without a greater external force 499. This may effectively hold the ear cups in a given clamping position (e.g., the low-clamp position shown in FIG. 4A) until an external force 499 is exerted on the ear cup cover 413 by the wearer to overcome the force of the viscous MR fluid 433 and move the magnets such that the MR fluid barrel 432 shifts from in between the magnets in that pair. For example, external force 499 may move the magnet pairs relative to the MR fluid barrel 432 away from its position between the magnets 421 and 423 to an intermediate position partially between both magnet pairs 421/423 and 422/424 or to a high-clamp position as shown in FIG. 4B below.

A user may exert an external force 499 on the ear cup cover 413 that is greater than the viscous force of the MR fluid 433 acting on the porous piston 431 to push the ear cup cover 413 and magnet pairs 421/423 and 422/424 toward the user's ear, partially compressing the ear cup cushion 411 around the user's ear to decrease outside noise or increase clamping force. In an embodiment, the wearer's external force 499 on the ear cup cover 413 moves the magnet pairs 421/423 and 422/424 with respect to the MR fluid barrel 432 such that MR fluid barrel 432 is disposed at least partially between the two magnet pairs 421/423 and 422/424 having magnetic flux acting on the MR fluid 433 in an intermediate position. As the user exerts such an external force 499 pushing the ear cup cover 413 toward the user's ear and the cushion 411, the MR fluid barrel 432 may move outward from the cushion 411 into the MR fluid barrel cavity such that it is in between the first magnet pair 421/423 and the second magnet pair 422/424 in an intermediate position.

The MR fluid 433 in an embodiment may become less viscous as one magnetic field is lessened and pass more easily through pores in the porous piston 431, to allow the porous piston 431 to move more easily with respect to the MR fluid barrel 432 but may establish a wall on both sides of the porous piston 431 when stopped in an intermediate position with the piston shaft 435 partially extended. In such a position between magnet pairs 421/423 and 422/424, the MR fluid 433 within the MR fluid barrel 432 may undergo magnetic flux on both sides due to its position between magnet pairs 421/423 and 422/424. The MR fluid 433 to become less viscous inside the porous piston 431, and allow the MR fluid 433 to pass more easily through the pores of the porous piston 431 to the outside of porous piston 431. In other words, moving the MR fluid barrel 432 in between magnet pairs 421/423 and 422/424 may allow the porous piston 431 to move more easily with respect to the MR fluid barrel 432 to an intermediate position. This range of adjustable clamping positions may continue until the MR fluid barrel 432 moves to a position between the next magnet pair (e.g., 422/424) in a high-clamp position as described in greater detail below with respect to FIG. 4B, and the magnetic flux between the magnets in that next magnet pair 422/424 increases viscosity of the MR fluid 422, outside the porous piston 431 with piston rod 435 extended with respect to the MR fluid barrel 432 when the MR fluid barrel is in an outermost position to increase clamping force of the headband on the ear cushions 411.

It is contemplated that more than two pairs of magnets may be housed within the ear cup cover 413 such that the MR fluid barrel 431 may be disposed in a greater range for a plurality of clamping force positions. For example, an intermediate magnet pair may be disposed between the innermost magnet pair 421/423 and the outermost magnet pair 422/424. As with the innermost and outermost magnet pairs 421/423 and 422/424, the magnets within the intermediate magnet pair may have opposing polarities to cause magnetic flux in between the magnets in this intermediate magnet pair in some embodiments. When the MR fluid barrel 432 in such an embodiment moves to a position between the intermediate magnets in this intermediate magnet pair, the magnetic flux between the intermediate magnets may increase viscosity of the MR fluid 433 in the same fashion as described above when the MR fluid barrel 432 is in the low-clamp position between the innermost magnet pair 421/423. This may add additional intermediate transition until the MR fluid barrel 432 is moved outward to outer magnet pair 422/424 and piston rod 435 fully extended in the high-clamp position. This may effectively hold the MR fluid barrel 432 in a greater range of intermediate clamping positions in which a portion of the MR fluid 433 is disposed on either side of the outer surface of the porous piston 431. This may result in an intermediate amount of viscous force exerted on the porous piston 431 by the highly viscous MR fluid 433, such that more intermediate positions of MR fluid barrel 432 are available in the MR fluid barrel receiver cavity of the outer ear cup cover 413.

FIG. 4B is a graphical diagram illustrating a cross-sectional view of an adjustable clamping earcup assembly placed in a high-clamp position that increases clamping force on the wearer's head according to an embodiment of the present disclosure. As described herein, when the MR fluid barrel 432 is positioned between the outermost magnet pair 422/424 in an outer position relative to ear cup cover 413 such that piston rod 435 is extended from the MR fluid barrel 432, the headband connector 412 exerts more clamping force from the headband on the ear cup cushion 411. In this outer position of the MR fluid barrel 432, the majority of the MR fluid 433 is aligned magnetically between outermost magnets 422/424 and disposed against the outer surface of the porous piston 431, away from the inner flange 434, causing maximum clamping force from the headband clamping action. That clamping force may transfer from the MR fluid barrel 432, the wall of magnetically aligned MR fluid 433, and the porous piston 431 and extended piston rod to the sound chamber 442, ear cup plate 442, and ear cup cushion 411 to cause a maximum clamping force on the user's head. This increased clamping force may then be released by the user pulling the ear cup cover 413 away from the ears, to move the magnet pair 422/424 and cause the MR fluid barrel 432 to move toward the innermost magnet pair 421/423 and allow the headband to expand to a lower clamping force intermediate position or a low clamping position as shown in FIG. 4A.

As described above with respect to FIG. 4A, the MR fluid 433 in an embodiment may become minimally viscous and pass more easily through pores in the porous piston 431 when the magnetic field of magnet pair 422/424 is lessened by movement, to allow the porous piston 431 to move more easily with respect to the MR fluid barrel 432 but may establish a wall on both sides of the porous piston 431. This may cause the MR fluid 433 to become less viscous, and allow the MR fluid 433 to pass more easily through the pores of the porous piston 431. If outside force is ceased in an intermediate position between magnet pairs 421/423 and 422/424, the MR fluid 433 within the MR fluid barrel 432 may form a wall on either side of porous piston 431 from magnetic flux due to its position between magnet pairs 421/423 and 422/424 in the intermediate position with a piston rod 435 partially extended.

The MR fluid barrel in an embodiment may move to a high-clamp position between the outer magnet pair 422/424 as shown in FIG. 4B, such that the magnetic flux between the outer magnet pair 422/424 causes the MR fluid 433 to become highly viscous, forming a wall external to the outer surface of and holding the porous piston 431 in place with respect to the MR fluid barrel 432. This yields a fully extended piston rod 435. In such a high-clamp position, the majority of the MR fluid 433 in such an embodiment may be magnetically aligned and disposed on the outer surface of the porous piston 433. The highly viscous MR fluid 433 in an embodiment may impede outward motion of porous piston 431, causing the MR fluid barrel 432 to be in an outer position and the headband connector 412 in an outer position causing a greater headband clamping force from the headband on the MR fluid barrel that is operatively coupled via the ear cup rotational tilt clamp 441. This greater clamping force then causes the piston assembly inner flange 434 to exert this greater clamping inward force on the sound chamber 442 the ear cup base plate 443 via the extended piston rod 435, as well as the cushion 411 toward user's ear. This magnetic wall of MR fluid 433 between magnets 422/424 assist to hold the ear cup cushion 411 in a high-clamp state.

The user in an embodiment may exert outward external force by pulling on the outer ear cup cover 413 away from the cushion 411 and the user's ear that overcomes viscosity of the MR fluid 433 caused by magnetic flux of the outer magnet pair 422/424 to pull the outer ear cup cover 413 and magnets away from the user's ear. Movement of the magnets in the MR fluid receiver cavity of the outer ear cup cover 413 with respect to the MR fluid barrel 432 from the outermost magnet pair 422/424 to the innermost magnet pair 421/423, moves the MR fluid barrel 432 in an embodiment back toward a lower headband clamping force position until the low-clamp position between the innermost magnet pair 421/423 is reached. As described in embodiments herein, this allows the headband connector shaft 412 to move outward and expand the headband and reduce the clamping force.

Figure 5:
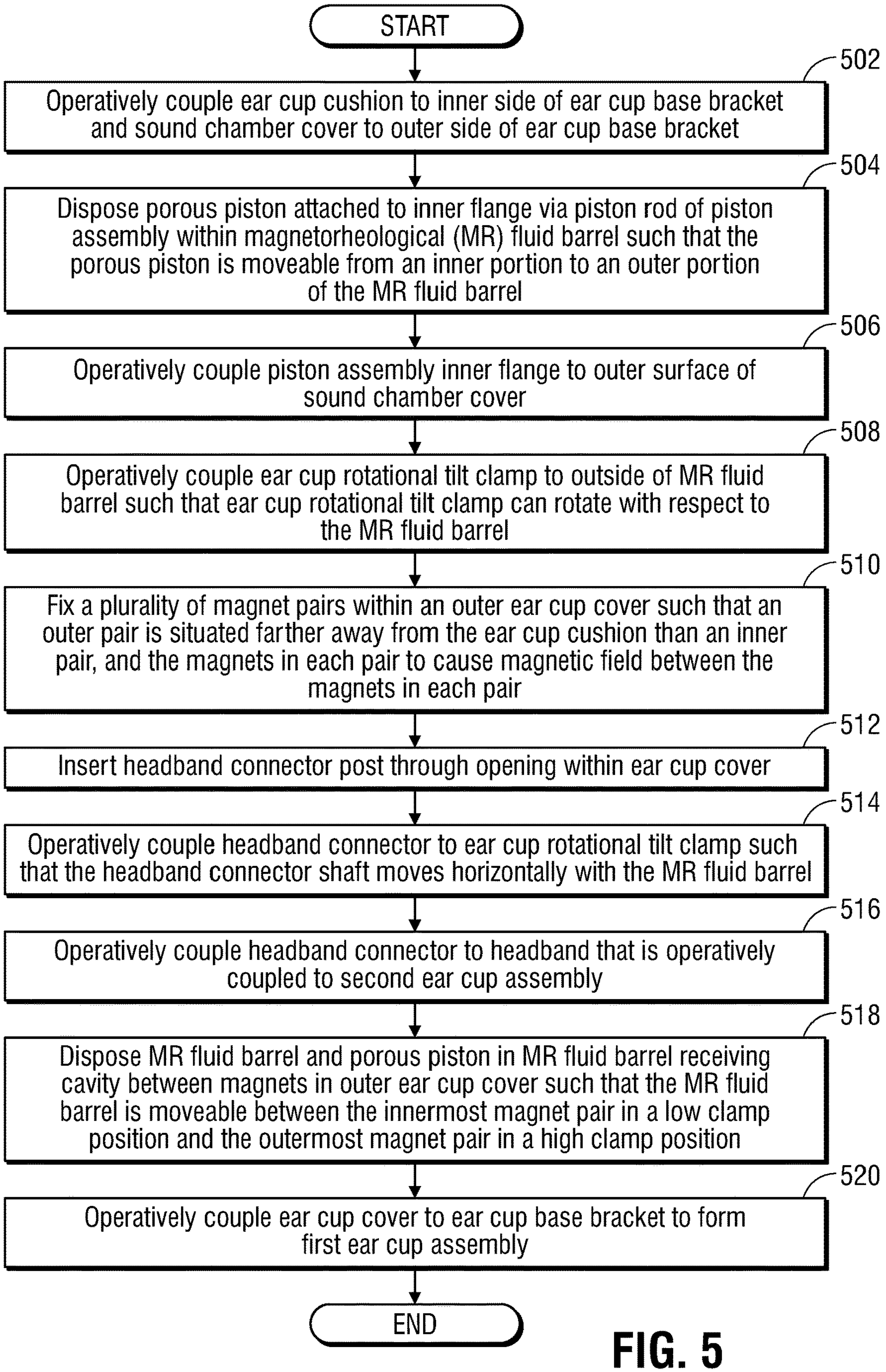
FIG. 5 is a flow diagram illustrating a method of manufacturing an adjustable clamping ear cup assembly for an audio headset according to an embodiment of the present disclosure.

FIG. 5 is a flow diagram illustrating a method of manufacturing an adjustable clamping ear cup assembly for an audio headset that provides varying degrees of clamping pressure on the user's head according to an embodiment of the present disclosure. As described herein, audio headsets such as headphones with cushioned ear cups that surround the ear provide some clamping force pulling the two ear cups together to remain firmly on the wearer's head, and in some cases to decrease audible external noise. Existing audio headsets either provide little to no adjustability in this clamping force or provide non-intuitive or complicated adjustment mechanisms, causing intrusive external noise in an under-clamped situation, or causing pain or irritation to the user's ears or head after a long period of use in an over-clamped position. The adjustable clamping earcup assembly in embodiments of the present disclosure employs a moveable porous piston and piston rod in an magneto-rheological (MR) fluid barrel that may apply clamping pressure of varying degrees on the ear cup cushion based on position of the MR fluid barrel between sets of magnets in an outer earcup cover. The user may adjust the clamping force on the wearer's head via external force applied by the wearer to their preference on the outer earcup cover to move the sets of magnets. The MR fluid barrel containing MR fluid may move with respect to the piston and with respect to the plurality of magnet sets within the earcup under external pressure by the wearer to apply varying degrees of clamping pressure from the headband on the MR fluid barrel depending on position of the porous piston and piston rod as held by viscosity of the MR fluid when position in the MR fluid barrel in the magnetic field of one or both sets of magnets.

At block 502, an ear cup cushion may be operatively coupled to an inner side of an ear cup base plate and a sound chamber cover may be operatively coupled to an outer side of the ear cup base plate in an embodiment. For example, in an embodiment described with reference to FIG. 2B, an ear cup cushion 211 may be operatively coupled to an inner side of an ear cup base plate 243 and a sound chamber cover 242 housing a speaker (not shown) may be operatively coupled to an outer side of the ear cup base plate 243. As another example, in an embodiment described with respect to FIG. 3, an ear cup cushion 311 may be operatively coupled to an inner side of an ear cup base plate 343 and a sound chamber cover 342 may be operatively coupled to an outer side of the ear cup base plate 343. In still another example embodiment described with reference to FIGS. 4A and 4B, an ear cup cushion 411 may be operatively coupled to an inner side of an ear cup base plate 443 and a sound chamber cover 442 may be operatively coupled to an outer side of the ear cup base plate 443.

In an embodiment at block 504, a porous piston attached to an inner flange via a piston rod of a piston assembly may be disposed within an MR fluid barrel, such that the porous piston is moveable from an inner portion to an outer portion of the MR fluid barrel such that the piston rod may extend or retract from the MR fluid barrel. For example, in an embodiment described with respect to FIG. 2B, a piston assembly 231 may be partially disposed within the MR fluid barrel 232, such that a porous piston of the piston assembly 231 with a piston rod disposed within the MR fluid barrel 232 is moveable from an inner portion (e.g., nearest the cushion 211) with fully extended piston rod to an outer portion (e.g., farthest from the cushion 211) of the MR fluid barrel 232 with a fully retracted piston rod or intermediate positions in between. In another example embodiment described with respect to FIG. 3, a porous piston 331 attached to an inner flange 334 via a piston rod 335 of a piston assembly that includes 331, 334, and 335 may be disposed within the MR fluid barrel 332 containing MR fluid 333, such that the porous piston 331 is moveable from an inner portion to an outer portion of the MR fluid barrel 332 to extend or retract piston rod 335. In yet another example embodiment described with reference to FIGS. 4A and 4B, a porous piston 431 attached to an inner flange 434 via a piston rod 435 of a piston assembly may be disposed within an MR fluid barrel 432, such that the porous piston 431 is moveable from an inner portion to an outer portion of the MR fluid barrel 432 to extend or retract piston rod 435.

At block 506, the piston assembly inner flange may be operatively coupled to an outer surface of the sound chamber cover in an embodiment. For example, in an embodiment described with respect to FIG. 2B, the piston assembly 231 may be operatively coupled to an outer surface of the sound chamber cover 242. As another example, in an embodiment described with respect to FIG. 3, the piston assembly inner flange 334 may be operatively coupled to an outer surface of the sound chamber cover 342. In yet another example embodiment described with reference to FIGS. 4A and 4B, the piston assembly inner flange 434 may be operatively coupled to an outer surface of the sound chamber cover 442.

An ear cup rotational tilt clamp in an embodiment at block 508 in an embodiment may be operatively coupled to an outside casing of the MR fluid barrel such that the ear cup rotational tilt clamp can rotate with respect to the MR fluid barrel. For example, in an embodiment described with reference to FIG. 2B, an ear cup rotational tilt clamp 241 may be operatively coupled to an outside casing of the MR fluid barrel 232 such that the ear cup rotational tilt clamp 241 can rotate with respect to the MR fluid barrel 232 but moves horizontally with the MR fluid barrel 232 and applies clamping force from headband connector 212 to the MR fluid barrel 232. In another example embodiment described with respect to FIG. 3, an ear cup rotational tilt clamp 341 may be operatively coupled to the sides of the MR fluid barrel 332 as well as headband connector 312 to provide clamping force from a headband. The ear cup rotational tilt clamp 341 can rotate with respect to the MR fluid barrel 332 but fixes to a horizontal position of the MR fluid barrel 332 to slidingly adjust clamping force from the headband and the headband connector 312. The headband clamping force imparted from the headband connector shaft 312 via the ear cup rotation tilt clamp 341 depends on whether it is pushed outward (higher clamping force) by extension of the piston rod 335 or allowed to relax inward to relax the clamping force when the piston rod 335 is retracted in the MR fluid barrel 332.

At block 510, a plurality of magnet pairs may be fixed within an outer ear cup cover to cause a magnetic field between the magnets in each pair. In an example embodiment described with respect to FIG. 2A, an outer earcup cover 213*a* or 213*b* is formed at operatively coupled to the adjustable clamping earcup assembly on an outer portion situated farthest from the earcup cushion 211*a* or 211*b*, respectively. An inner portion of each adjustable clamping earcup assembly 210*a* or 210*b* is formed to house a speaker and operatively couple to a piston and MR fluid barrel disposed within a MR fluid barrel receiver cavity inside within the outer earcup cover 213*a* or 213*b*, respectively, that has pairs of magnets coupled inside thereto.

In another example embodiment described with reference to FIG. 2C, a plurality of magnet pairs 221/223 and 222/224 may be fixed within an outer ear cup cover housing 213 in a MR fluid barrel receiving cavity 225 such that an outer pair including 222 and 224 is situated further away from the ear cup cushion than an inner pair including 221 and 223. In an embodiment, the magnets in each pair 221/223 and 222/224 have opposing polarities to cause magnetic flux between the magnets in each pair. More specifically, magnet 222 may have a polarity that is opposite the polarity of magnet 224 to cause magnetic flux between magnets 222 and 224 within the outermost magnet pair. As another example, magnet 223 may have a polarity that is opposite the polarity of magnet 221 to cause magnetic flux between magnets 221 and 223 within the innermost magnet pair. Any combination of polarities of magnet sets to form magnetic field between magnet sets may be used. Further, magnets 221 and 222 may have the same polarity to impede magnetic flux between magnets 221 and 222, and magnets 223 and 224 may have the same polarity to impeded magnetic flux between magnets 223 and 224 in some embodiments.

In yet another example embodiment described with respect to FIG. 3, a plurality of magnet pairs 321/323 and 322/324 may be fixed within an MR fluid barrel receiving cavity (e.g., 225 of FIG. 2C) in an ear cup cover 313 such that an outer pair 322/324 is situated further away from the ear cup cushion 311 than an inner pair 321/323, and the magnets in each pair 321/323 and 322/324 have opposing polarities to cause magnetic flux between the magnets in each pair.

A headband connector post in an embodiment at block 512 may be inserted through an opening within the ear cup cover. For example, in an embodiment described with reference to FIGS. 2A and 2C, a headband connector post 212 may be inserted through an opening 215 within the outer ear cup cover housing 213. In another example embodiment described with respect to FIG. 3, a headband connector post 312 may be inserted through an opening 315 within the outer ear cup cover 313.

At block 514, the headband connector shaft may be operatively coupled in an embodiment to the ear cup rotational tilt clamp. For example, in an embodiment described with reference to FIG. 2B, the headband connector shaft 212 may be operatively coupled to the ear cup rotational tilt clamp 241 such that the headband clamping force is adjustable depending on the extension or retraction of the piston assembly 231 inside the MR fluid barrel 232. The headband connector shaft 212 moves horizontally with the MR fluid barrel 232 as it is pushed outward or allowed inward by extension or retraction of the piston rod of piston assembly 231 according to embodiments herein. In another example embodiment described with respect to FIG. 3, the headband connector shaft 312 may be operatively coupled to the ear cup rotational tilt clamp 341 and the MR fluid barrel 332. The headband connector shaft 312 again will move horizontally with the MR fluid barrel 332 as it is pushed outward or allowed inward by extension or retraction of the piston rod 335 when the porous piston 331 is moved in the MR fluid barrel 332 and held by a magnetic field establishing a wall of aligned magnetic particles on one or both sides of porous piston 331 according to embodiments herein.

In an embodiment at block 516, the headband connector may be operatively coupled to a headband that is operatively coupled to a second ear cup assembly such that the headband connector post moves horizontally with the MR fluid barrel. For example, in an embodiment described with respect to FIG. 2A, an adjustable clamping earcup assembly 210*a* may comprise a right ear cup to be worn over a wearer's right ear. A second adjustable clamping ear cup assembly 210*b* may also comprise a left ear cup to be worn over a wearer's left ear. Each adjustable clamping ear cup assembly 210*a* and 210*b* may be formed to include an ear cup cushion 211*a* or 211*b* to be disposed around the wearer's ear, operatively coupled to a speaker platform, an outer earcup cover 213*a* or 213*b*, and a portion of a headband connector 212 to clamping headband 201. The audio headset 280 in an embodiment may include the pair of adjustable clamping ear cup assemblies 210*a* and 21*b* with cushioned ear cups 211*a* and 211*b*, with outer earcup covers 213*a* and 213*b* that surround the wearer's ear and provide some clamping force via headband 201 pulling the two ear cups together to remain firmly on the wearer's head, and in some cases to decrease audible external noise. The left adjustable clamping earcup assembly including 210*a* may be operably coupled to headband 201 via the headband connector 212*a*, and the headband 201 may also be operatively coupled to the right adjustable clamping earcup assembly 210*b* via headband connector 212*b* in an embodiment.

The MR fluid barrel and porous piston in an embodiment at block 518, may be disposed in MR fluid receiving cavity between magnets in the outer ear cup cover such that the MR fluid barrel is moveable between the innermost magnet pair in a low clamp position and the outermost magnet pair in a high clamp position. For example, in an embodiment described with reference to FIG. 3, the MR fluid barrel 332 with the porous piston 331 inside may be disposed between the magnets 321 and 323 or 322 and 324 in the outer ear cup cover 313 such that the MR fluid barrel 332 is moveable from a low-clamp position between the innermost magnet pair 321/323 in which the MR fluid 333 forms a magnetic wall of fluid inside the porous piston 331 such that piston rod 335 is retracted and exerts a minimal clamping force to a high-clamp position between the outermost magnet pair 322/324 in which the MR fluid forms a magnetic wall of fluid outside the porous piston 331 such that piston rod 335 is extended and exerts a maximum clamping force. In one specific example, the MR fluid barrel 332 and porous piston 331 in an embodiment may be disposed between the outer magnet pair 322 and 324, such that the majority of the MR fluid 333 aligns between the magnet pair 332 and 324 and is disposed outside the outer surface of the porous piston 331. High viscosity of the MR fluid 333 due to alignment of magnet particles in the MR fluid 333 between outer magnet pair 322 and 324 in such a scenario may impede outward movement of the porous piston 331 with the piston rod 335 extended with respect to the MR fluid barrel 332, causing inward clamping force on the porous piston 331 and piston toward the cushion 311 to be increased by the headband since the headband connector shaft 312 is in an outward position causing more clamping force from the headband.

In another example embodiment described with reference to FIG. 4A, the MR fluid barrel 432 and porous piston 431 may be fully disposed between the inner magnet pair 421 and 423 in a low-clamp position in which the MR fluid 433 holds the porous piston 431 such that piston rod 435 is retracted. This is due to the fact that majority of the MR fluid 433 magnetic particles are aligned in a high-viscosity wall disposed inside the inner surface of the porous piston 431, or between the porous piston 431 and the flange 434 causing the piston rod 435 to be retracted within the MR fluid barrel 432. Thus, very little of the MR fluid 433 may be situated outside of the porous piston 431 and the MR fluid barrel is in an inward position allowing the headband connector shaft 412 to move inward to reduce clamping force from the operatively-coupled headband connector shaft 412, and thus, the headband is allowed to open some. Headband connector shaft 412 is operatively coupled with and able to move horizontally with the MR fluid barrel 432, via the ear cup rotational tilt clamp 441.

In yet another example embodiment described with reference to FIG. 4B, the MR fluid barrel may move to a high-clamp position between the outer magnet pair 422/424, such that the magnetic flux between the outer magnet pair 422/424 causes the MR fluid 433 to become highly viscous, forming a wall external to and holding the porous piston 431 in place with respect to the MR fluid barrel 432 with the piston rod 435 extended. In such a high-clamp position, the majority of the MR fluid 433 in such an embodiment may be magnetically aligned and disposed on the outer surface of the porous piston 433 holding the piston rod 435 extended from the MR fluid barrel 432. The highly viscous MR fluid 433 in an embodiment may impede outward motion of porous piston 431, causing the MR fluid barrel 432 to be in an outer position as pushed out by the extended piston rod 435 and moving the headband connector shaft 412 outward causing a greater clamping force from the headband that is operatively coupled via the ear cup rotational tilt clamp 441. This greater clamping force is then applied across the piston assembly inner flange 434 to exert greater inward clamping force on the sound chamber 442 the ear cup base plate 443, and the cushion 411 toward user's ear, and hold the ear cup cushion 411 in a high-clamp state.

At block 520, the ear cup cover in an embodiment is operatively coupled to the ear cup base plate to form a first ear cup assembly. For example, the ear cup cover 313 in an embodiment may be operatively coupled to the ear cup base 343 plate to form a first ear cup assembly. A similar process may occur for a second ear cup assembly on the opposite side of the headband according to embodiments herein.

In such a way, the adjustable clamping earcup assembly may apply clamping pressure of varying degrees on the ear cup cushion and the wearer's head under external force applied by the wearer to their preference. The method for manufacturing an adjustable clamping ear cup assembly for an audio headset that provides varying degrees of clamping pressure on the user's head may then end.

Figure 6:
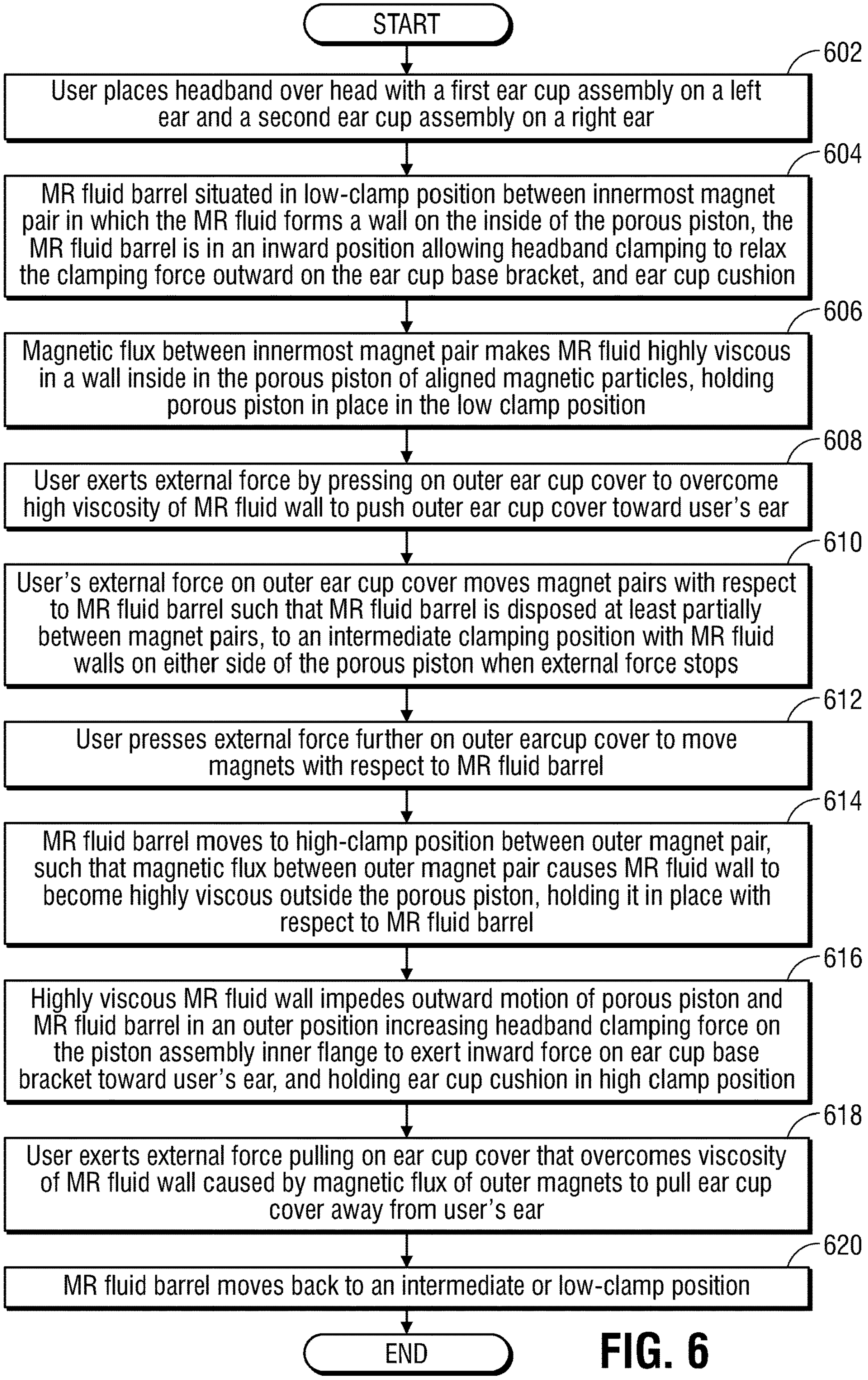
FIG. 6 is a flow diagram illustrating a method of moving an adjustable clamping ear cup assembly between a low-clamp position and a high-clamp position according to an embodiment of the present disclosure.

FIG. 6 is a flow diagram illustrating a method of moving an adjustable clamping ear cup assembly between a low-clamp position exerting minimal clamping force from a headband on an earcup assembly porous piston and piston rod in a retracted position within an magnetorheological (MR) fluid barrel housed within the ear cup cover and a high-clamp position exerting maximum force via the clamping headband on the earcup assembly via the porous piston and piston rod in an extended position according to an embodiment of the present disclosure. As described herein, a porous piston of the adjustable clamping ear cup assembly in an embodiment may be situated within a MR fluid barrel that is moveable from a low-clamp position between a pair of innermost magnets in which a majority of the MR fluid is magnetically aligned and disposed on the inner surface of the porous piston to a high-clamp position between a pair of outermost magnets in which the majority of the MR fluid is magnetically aligned and disposed on the outer surface of the porous piston in the MR fluid barrel to move a piston rod from a retracted position to an extended position relative to the MR fluid barrel.

At block 602, a user in an embodiment may place the headband over the user's head with a first ear cup assembly on a left ear and a second ear cup assembly on a right ear. For example, in an embodiment described with respect to FIG. 2A, a wearer in an embodiment may place the headband 201 over the wearer's head with a left ear cup assembly 210*a* on a left ear and the right ear cup assembly 210*b* on the right ear.

The MR fluid barrel in an embodiment at block 604 may be situated in a low-clamp position between the innermost magnet pair in which the MR fluid forms a wall on the inside of the porous piston, the MR fluid barrel is in an inward position such that the piston rod is retracted and the headband connector shaft allowed to move inward allowing the headband clamping to relax the clamping force on the ear cup base bracket, and ear cup cushion. For example, in an embodiment described with reference to FIG. 4A, the MR fluid barrel 432 and porous piston 431 may be fully disposed between the inner magnet pair 421 and 424 in a low-clamp position in which the MR fluid 433 holds the porous piston 431 such that the piston rod 435 is retracted into the MR fluid barrel 432. This is due to the majority of the MR fluid 433 magnetic particles being aligned in a high-viscosity wall disposed inside the outer surface of the porous piston 431, or between the porous piston 431 and the flange 434, to hold the piston rod in the retracted position inside the MR fluid barrel 432. Thus, very little of the MR fluid 433 may be situated outside of the porous piston 431 and the MR fluid barrel is in an inward position with a retracted piston rod 435 which moves the headband connector shaft 412 inward and reduces clamping force from the operatively-coupled headband connector shaft 412, and thus, the headband is allowed to open some. Headband connector shaft 412 is operatively coupled with and able to move horizontally with the MR fluid barrel 432, via the ear cup rotational tilt clamp 441.

At block 606, magnetic flux between innermost magnet pair makes MR fluid highly viscous in a wall inside in the porous piston of aligned magnetic particles, holding porous piston in place in the low clamp position and the piston rod in a retracted position in the MR fluid barrel. For example, in an embodiment described with reference to FIG. 2C, magnetic flux or other magnetic field influence between the innermost magnet pair including 221 and 223 in an embodiment may make magnetic particles align in the MR fluid disposed between magnets 221 and 223 and inside the inner surface of the porous piston to make it highly viscous in the magnetic field between innermost magnet pair 221 and 223 when the MR fluid barrel is moved between these magnets 221 and 223. This holds a porous piston in place with respect to the innermost magnet pair 221 and 223. In another example embodiment described with reference to FIG. 4A, magnetic flux between the innermost magnet pair 421 and 423 may make the MR fluid 433 highly viscous between the magnets 421 and 423, holding the porous piston 431 in place with respect to the MR fluid barrel 432 holding the piston rod 435 in a retracted position. This, in turn, may hold the MR fluid barrel 432 and the MR fluid 433 in place with respect to the porous piston 431 and the retracted piston rod 435 such that the headband connector shaft 412 is in an innermost a position to reduce the headband clamping force from the headband which is allowed to expand or relax the force. The magnetic field setting up the wall of MR fluid 433 provides a constant level of minimal pressure on the inside surface of porous piston 431 by the viscosity of the MR fluid 433 to hold the piston rod in a retracted position and yield a low-clamp force from the headband. As described herein, the magnetic flux between any given pair of magnets (e.g., 421/423 or 422/424) housed within the ear cup cover 413 may cause the MR fluid 433 disposed between those magnets to become highly viscous via alignment of magnetic particles in those magnetic fields forming a wall to impede movement of the MR fluid barrel 432 with respect to the porous piston and magnets without a greater external force 499. This may effectively hold the ear cups in a given clamping force position (e.g., the low-clamp force position shown in FIG. 4A) until an external force 499 is exerted on the ear cup cover 413 by the wearer to overcome the force of the viscous MR fluid 433 and move magnet pairs 421/423 or 422/424 with respect to the MR fluid barrel 432, such as moving the MR fluid barrel 432 away from its position between the magnets 421 and 423 to an intermediate position partially between both magnet pairs 421/423 and 422/424 or to a high-clamp position.

A user in an embodiment at block 608 may exert an external force by pressing on the outer ear cup cover to push the outer ear cup cover toward the user's ear moving the magnet pairs with respect to the MR fluid barrel and overcome the high viscosity of the MR fluid wall. For example, in an embodiment described with reference to FIG. 4A, a user may exert an external force 499 on the ear cup cover 413 that is greater than the viscous force of the MR fluid 433 acting to hold the porous piston 431 to push the ear cup cover 413 and magnet pairs 421/423 and 422/424 toward the user's ear, partially compressing the ear cup cushion 411 around the user's ear to decrease outside noise or increase clamping force.

At block 610 in an embodiment, the user's external force on the outer ear cup cover moves the magnet pairs with respect to the MR fluid barrel such that the MR fluid barrel is disposed at least partially between both magnet pairs to an intermediate clamping position with MR fluid walls on either side of the porous piston when the external force stops being applied. For example, in an embodiment described with respect to FIGS. 2B and 2C, the wearer's external force on the outer ear cup cover housing 213 may move the magnet pairs (e.g., 221 and 223, or 222 and 224) with respect to an MR fluid barrel disposed between them in an MR fluid barrel receiving cavity 225 such that MR fluid barrel is disposed at least partially between either or both of the two magnet pairs. This establishes one or more magnetic fields acting on the MR fluid within the MR fluid barrel. In other words, the MR fluid barrel containing the MR fluid may be disposed at least partially between the pair of magnets 221 and 223 and the pair of magnets 222 and 224 with a wall established on either side of the porous piston inside MR fluid barrel 252 to hold a porous piston and piston rod of porous piston assembly 231 in an intermediate extended position.

In another example embodiment described with reference to FIG. 4A, the wearer's external force 499 on the ear cup cover 413 moves the magnet pairs 421/423 and 422/424 with respect to the MR fluid barrel 432 such that MR fluid barrel 432 is disposed at least partially between the two magnet pairs 421/423 and 422/424 having magnetic flux acting on the MR fluid 433 in an intermediate position. As the user exerts such an external force 499 pushing the ear cup cover 413 toward the user's ear and the cushion 411, the MR fluid barrel 432 may move outward from the cushion 411 into the MR fluid barrel receiving cavity such that it is in between the first magnet pair 421/423 and the second magnet pair 422/424 in an intermediate position.

In an embodiment described with reference to FIG. 4A, the MR fluid 433 may become reduce viscosity when the magnetic field is moved away and pass more easily through pores in the porous piston 431, to allow the porous piston 431 to move more easily with respect to the MR fluid barrel 432 but may establish a wall on both sides of the porous piston 431. In such a position between magnet pairs 421/423 and 422/424, the MR fluid 433 within the MR fluid barrel 432 may undergo magnetic flux due to its position between magnet pairs 421/423 and 422/424 to form the wall on both sides of porous piston 431 holding the piston rod in a partially extended position. In other words, moving the MR fluid barrel 432 in between magnet pairs 421/423 and 422/424 may allow the porous piston 431 to move with respect to the MR fluid barrel 432 and partially or fully extend the piston rod 435. This range of adjustable clamping positions may continue through intermediate positions until the MR fluid barrel 432 moves to an outward position between the next magnet pair (e.g., 422/424) in a high-clamp force position as described in greater detail below with respect to FIG. 4B, and the magnetic flux between the magnets in that next magnet pair 422/424 increases viscosity of the MR fluid 422 outside the porous piston 431 with respect to the MR fluid barrel 432. This extends the piston rod 435 further in additional intermediate positions and holds the MR fluid barrel in a further outward position also holding the operatively coupled headband connector shaft 412 in a further outward intermediate position to increase clamping force of the headband on the ear cushions 411.

The user in an embodiment at block 612 may press external force further on the outer earcup cover to move magnets with respect to the MR fluid barrel to a high-clamp force position. For example, a wearer's further external force 499 on the ear cup cover 413 moves the magnet pairs 421/423 and 422/424 with respect to the MR fluid barrel 432 such that MR fluid barrel 432 is disposed between the magnet pair 422/424 having magnetic flux acting on the MR fluid 433 in a high-clamp position. As the user exerts such an external force 499 pushing the ear cup cover 413 toward the user's ear and the cushion 411, the MR fluid barrel 432 may move outward from the cushion 411 into the MR fluid barrel receiving cavity such that it is in an outermost position between the second magnet pair 422/424 in a high-clamp force position.

The MR fluid barrel in an embodiment at block 614 may move to a high-clamp force position between an outer magnet pair, such that magnetic flux between the outer magnet pair causes a MR fluid wall to become highly viscous outside the outer surface of the porous piston, holding it in place with respect to MR fluid barrel and extending the piston rod outward to a fully extended position. For example, in an embodiment described with reference to FIGS. 2B and 2C, the MR fluid barrel in an embodiment may be moved to a high-clamp force position between the outer magnet pair 222 and 224 from a lower clamp force position fully or partially between inner magnet pair 221 and 223. The magnetic flux between the outer magnet pair 222 and 224 may cause MR fluid within the MR fluid barrel to become highly viscous in that magnetic field creating a wall of aligned magnetic particles external to the outer surface of the porous piston holding the porous piston in place with respect to the MR fluid barrel and the piston rod of the porous piston assembly 231 in a fully extended position. In another example embodiment described with reference to FIG. 3, the MR fluid barrel 332 may be placed in a high-clamp position between the outer magnet pair 322 and 324, and the magnetic flux between the outer magnet pair 322 and 324 causes the MR fluid 333 to become highly viscous forming a wall outside the outer surface of the porous piston 331 and extending the piston rod 335 fully. This high viscosity force may hold the porous piston 331 and extended piston rod 335 in place with respect to the MR fluid barrel 332 which is an outer most position and causes the operatively coupled headband connector shaft 312 to an outer position generating a high-clamp force from the headband.

In still another example embodiment described with respect to FIG. 4B, the MR fluid barrel 432 may move to the high-clamp force position between the outer magnet pair 422/424, such that the magnetic flux between the outer magnet pair 422/424 causes the MR fluid 433 to become highly viscous, forming a wall external to and holding the porous piston 431 in place with respect to the MR fluid barrel 432 while causing the piston rod 435 to be fully extended.

At block 616, the highly viscous MR fluid wall may impede outward motion of the porous piston and extend the piston rod fully such that the MR fluid barrel and headband connector shaft is in an outer position, increasing the headband clamping force from the headband on the piston assembly inner flange to exert maximum inward clamping force on ear cup base bracket toward user's ear, and holding ear cup cushion in high clamp force position. For example, in an embodiment described with reference to FIG. 3, the highly viscous MR fluid 333 may impede outward motion of porous piston 331 extending piston rod 335, causing the piston assembly inner flange 334 to exert inward force from the headband on the ear cup base plate 343 toward the user's ear, and hold the ear cup cushion 311 in a high-clamp force state due to the headband connector post 312 being pushed out to a outermost position and extending the headband and increasing the headband clamping force to the high-clamp force state.

In another example embodiment described with reference to FIG. 4B, in a high-clamp force position, the majority of the MR fluid 433 may be magnetically aligned and disposed on the outer surface of the porous piston 433. The highly viscous MR fluid 433 in an embodiment may impede outward motion of porous piston 431 and cause the piston rod 435 to be fully extended. This full extension of the piston rod 435 in turn causes the MR fluid barrel 432 to be in an outermost position and the headband connector shaft 412 to also be in an outermost position. This generates a greater clamping force from the headband that is extended and operatively coupled via the ear cup rotational tilt clamp 441 to the MR fluid barrel 432. This greater clamping force then causes the piston assembly inner flange 434 to exert greater clamping inward force on the sound chamber 442 the ear cup base plate 443, and the cushion 411 toward user's ear, and holds the ear cup cushion 411 in a high-clamp state.

The user in an embodiment at block 618 may exert external force on the ear cup cover that overcomes the viscosity of the MR fluid wall caused by the magnetic flux of the outer magnets to pull the ear cup cover away from the user's ear to reduce the clamping force in an intuitive motion. For example, in an embodiment described with respect to FIG. 4B, the user may exert outward external force on the ear cup cover 413 by pulling it away from the cushion 411 and the user's ear and moves the magnet pairs and overcomes viscosity of the MR fluid 433 caused by magnetic flux of the outer magnet pair 422/424. This causes the user to pull the ear cup cover 413 away from the user's ear and move the magnet pair 422/424 and magnet pair 421/423 with respect to the MR fluid barrel 432.

The MR fluid barrel in an embodiment at block 620 may move back to a lower clamping force intermediate or the low-clamp position. For example, in an embodiment described above with respect to FIG. 4B, movement of the magnets in the MR fluid barrel receiver cavity of the outer ear cup cover 413 with respect to the MR fluid barrel 432 from the outermost magnet pair 422/424 to the innermost magnet pair 421/423, moves the MR fluid barrel 432 in an embodiment back to a lower clamp force position or to the low-clamp position between the innermost magnet pair 421/423 to allow the headband connector post 412 to move inward and allow expansion the headband and reduce the clamping force. This is done according to embodiments described herein.

In such a way, an adjustable clamping ear cup assembly may be adjusted between a low-clamp position exerting minimal force via a porous piston and retracted piston rod in the MR fluid barrel housed within the ear cup cover and a high-clamp position exerting maximum force on the porous piston and extended piston rod in the MR fluid barrel according to an embodiment of the present disclosure. The method for moving an adjustable clamping ear cup assembly between a low-clamp position exerting minimal force on a porous piston housed within the ear cup cover and a high-clamp position exerting maximum force on the porous piston may then end.

The blocks of the flow diagram of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An adjustable clamping earcup assembly for an audio headset comprising:

an ear cup base plate having an inner base plate surface affixed to an ear cup cushion and an outer base plate surface operably coupled to a porous piston disposed in a magnetorheological (MR) fluid barrel via a piston rod;

an outer ear cup cover operatively coupled to the ear cup cushion to enclose the ear cup base plate, the piston rod, and the porous piston disposed within the MR fluid barrel containing a MR fluid, where the outer ear cup cover includes a MR fluid barrel receiving cavity with a plurality of magnet pairs generating magnetic flux including an outermost magnet pair and an innermost magnet pair across a portion of the MR fluid barrel depending on position of the MR fluid barrel in the MR fluid barrel receiving cavity to adjust extension or retraction of the piston rod; and the MR fluid barrel operatively coupled to a clamping headband via a headband connector post horizontally moveable with respect to the MR fluid barrel such that an external force applied by a wearer on the outer ear cup cover moves the plurality of magnet pairs from a low-clamp force position of the MR fluid barrel between the innermost magnet pair in which the piston rod is retracted inside the MR fluid barrel and the clamping headband exerts a minimal clamping force to a high-clamp force position of the MR fluid barrel between the outermost magnet pair in which the piston rod is extended and the clamping headband exerts a maximal clamping force for the adjustable clamping earcup assembly.

2. The adjustable clamping earcup assembly of claim 1, wherein each of the plurality of magnet pairs generates the magnetic flux to cause a plurality of magnetic particles within the MR fluid disposed between one of the plurality of magnet pairs to align into a viscous wall to hold movement of the porous piston and hold the piston rod with respect to the MR fluid barrel.

3. The adjustable clamping earcup assembly of claim 1 further comprising:

the MR fluid barrel moveable from the low-clamp force position to the high-clamp force position under the external force applied by the wearer that is a pushing external force to increase a clamping force compresses the ear cup cushion and moves the plurality of magnet pairs with respect to the MR fluid barrel to increase the extension of the piston rod from the MR fluid barrel.

4. The adjustable clamping earcup assembly of claim 1 further comprising:

the MR fluid barrel moveable from the high-clamp force position to the low-clamp force position under the external force applied by the wearer that is a pulling external force to reduce a clamping force moves the plurality of magnet pairs with respect to the MR fluid barrel to retract the piston rod within the MR fluid barrel.

5. The adjustable clamping earcup assembly of claim 1 further comprising:

the plurality of magnet pairs including an intermediate magnet pair disposed between the innermost magnet pair and the outermost magnet pair; and the MR fluid barrel moveable to an intermediate-clamp position between the intermediate magnet pair and either the innermost magnet pair and the outermost magnet pair in which the clamping headband exerts an intermediate clamping force on the porous piston, ear cup base plate, and ear cup cushion that is less than the maximum clamping force.

6. The adjustable clamping earcup assembly of claim 1, wherein the pushing external force of the wearer is greater than a viscosity force placed on the porous piston by the MR fluid in a highly viscous state disposed between one of the plurality of magnet pairs to cause movement of the MR fluid barrel with respect to the plurality of magnet pairs.

7. The adjustable clamping earcup assembly of claim 1 further comprising:

the MR fluid barrel moveable to an plurality of inter-magnet positions between the plurality of magnet pairs in which the MR fluid is exposed to magnetic flux on both sides of the porous piston with respect to the MR fluid barrel to hold the extension of the piston rod in an intermediate extension and the MR fluid barrel between the low-clamp position to the high-clamp position such that the clamping headband exerts an intermediate clamping force on the porous piston, ear cup base plate, and ear cup cushion that is less than the maximum clamping force.

8. A method of manufacturing an adjustable clamping earcup assembly for an audio headset comprising:

fixing an ear cup base plate having an inner base plate surface to an ear cup cushion;

operatively coupling an outer base plate surface to a porous piston via a piston rod, where the porous piston is disposed within a magnetorheological (MR) fluid barrel containing a MR fluid;

attaching an outer ear cup cover to the ear cup cushion to enclose the ear cup base plate, having a plurality of magnet pairs, including an outermost magnet pair and an innermost magnet pair around a MR fluid barrel receiving cavity, where each of the plurality of magnet pairs generates magnetic flux to cause a plurality of magnetic particles within the MR fluid disposed between one of the plurality of magnet pairs to align into a viscous wall to hold the porous piston and piston rod in position with respect to the MR fluid barrel; and operatively coupling the MR fluid barrel to a clamping headband such that the MR fluid barrel and a headband connector shaft is horizontally moveable with respect to the outer ear cup cover and the plurality of magnet pairs under an external force of a wearer between a low-clamp position between the innermost magnet pair in which the piston rod is retracted in the MR fluid barrel such that the clamping headband exerts a minimal clamping force and a high-clamp position between the outermost magnet pair in which the piston rod is extended from the MR fluid barrel such that the clamping headband exerts a maximal clamping force on the porous piston, ear cup base plate and ear cup cushion.

9. The method of claim 8, wherein the MR fluid barrel is operatively coupled to a clamping headband via the headband connector shaft and an ear cup rotation tilt clamp such that the MR fluid barrel and the headband connector shaft is horizontally moveable relative to extension or retraction of the piston rod.

10. The method of claim 8, wherein the MR fluid barrel is moveable from the low-clamp position to the high-clamp position under the external force applied by the wearer that is a pushing external force that moves the plurality of magnet pairs with respect to the MR fluid barrel to extend the piston rod.

11. The method of claim 8, wherein the MR fluid barrel is moveable from the high-clamp position to the low-clamp position under the external force applied by the wearer that is a pulling external force that moves the plurality of magnet pairs with respect to the MR fluid barrel to retract the piston rod.

12. The method of claim 8 further comprising:

disposing an intermediate magnet pair between the innermost magnet pair and the outermost magnet pair in the MR fluid barrel receiving cavity.

13. The method of claim 8 further comprising:

disposing a speaker within a speaker cavity cover at the ear cup base plate, where the piston shaft is operatively coupled to the speaker cavity cover.

14. The method of claim 8 further comprising:

operatively coupling the adjustable clamping earcup assembly to a second adjustable clamping earcup assembly via the headband to form the audio headset with adjustable clamp force positions around a wearer's head.

15. An audio headset having a plurality of earcup assemblies, at least one earcup assembly is an adjustable clamping earcup assembly comprising:

an ear cup base plate having an inner base plate surface affixed to an ear cup cushion and an outer base plate surface operably coupled to a porous piston via a piston rod that extendable or retractable within a magnetorheological (MR) fluid barrel containing a MR fluid;

an outer ear cup cover attached to the ear cup base plate to cover the ear cup base plate and enclose the MR fluid barrel with the porous piston disposed within and a speaker, where the outer ear cup cover includes an outermost magnet pair and an innermost magnet pair to each generate an inner magnetic flux and an outer magnetic flux to cause the a plurality of magnetic particles within the MR fluid disposed between one of the plurality of magnet pairs to align into a viscous wall to impede movement of the porous piston and the piston rod with respect to the MR fluid barrel; and the MR fluid barrel operatively coupled to a clamping headband via a headset connector shaft and horizontally moveable with respect to the MR fluid barrel and adjustable between a low-clamp force position with the MR fluid barrel having a retracted piston rod between the innermost magnet pair and a high-clamp force position with the MR fluid barrel having an extended piston rod between the outermost magnet pair.

16. The adjustable clamping earcup assembly of claim 15 further comprising:

the MR fluid barrel moveable from the low-clamp force position to the high-clamp force position under a pushing external force applied by the wearer to the outer ear cup cover to increase a clamping force that moves the plurality of magnet pairs with respect to the MR fluid barrel to extend the piston rod and move the headband connector shaft and MR fluid barrel to an outer position.

17. The adjustable clamping earcup assembly of claim 15 further comprising:

the MR fluid barrel moveable from the high-clamp position to the low-clamp position under a pulling external force applied by the wearer to the outer ear cup cover to decrease a clamping force that moves the plurality of magnet pairs with respect to the MR fluid barrel to retract the piston rod and move the headband connector shaft and MR fluid barrel to an inner position relax the clamping force of the clamping headband.

18. The adjustable clamping earcup assembly of claim 15, wherein a viscosity force placed on the porous piston by the MR fluid in a highly viscous state disposed between at least one of the plurality of magnet pairs impedes movement of the MR fluid barrel with respect to the plurality of magnet pairs to hold the porous piston, piston rod, and MR fluid barrel into position until an external force greater than the viscosity force is applied by the wearer.

19. The adjustable clamping earcup assembly of claim 15, wherein the pushing external force of the wearer is greater than a viscosity force placed on the porous piston by the MR fluid in a highly viscous state disposed between one of the plurality of magnet pairs to cause movement of the MR fluid barrel with respect to the plurality of magnet pairs.

20. The adjustable clamping earcup assembly of claim 15 further comprising:

the MR fluid barrel moveable to an inter-magnet position between two of the plurality of magnet pairs in which the MR fluid of the MR fluid barrel is exposed to magnetic flux from both the inner magnetic pair and the outer magnetic pair to hold the MR fluid barrel in an intermediate clamp force position between the low-clamp force position and the high-clamp force position.

* * * * *